US012759622B2

(12) United States Patent
Wada et al.

(10) Patent No.: US 12,759,622 B2
(45) Date of Patent: Oct. 13, 2026

(54) CONTROL SYSTEM FOR WORK VEHICLE AND CONTROL METHOD FOR WORK VEHICLE

(71) Applicant: Komatsu Ltd., Tokyo (JP)

(72) Inventors: Taichi Wada, Tokyo (JP); Yosuke Kadono, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/709,595

(22) PCT Filed: Nov. 9, 2022

(86) PCT No.: PCT/JP2022/041725
§ 371 (c)(1),
(2) Date: May 13, 2024

(87) PCT Pub. No.: WO2023/085321
PCT Pub. Date: May 19, 2023

(65) Prior Publication Data

US 2025/0002078 A1 Jan. 2, 2025

(30) Foreign Application Priority Data

Nov. 15, 2021 (JP) ................................ 2021-185956

(51) Int. Cl.
*B62D 6/00* (2006.01)
*B62D 5/06* (2006.01)

(52) U.S. Cl.
CPC ............. *B62D 6/001* (2013.01); *B62D 5/061* (2013.01); *B62D 5/062* (2013.01)

(58) Field of Classification Search
CPC ........ B62D 6/001; B62D 5/061; B62D 5/062; B62D 5/07; B60P 1/04; E02F 9/20
See application file for complete search history.

(56) References Cited

U.S. PATENT DOCUMENTS

2011/0029199 A1* 2/2011 Saito ...................... B62D 12/00 701/41
2015/0375777 A1 12/2015 Endo et al.
(Continued)

FOREIGN PATENT DOCUMENTS

AU 2014354005 B8 * 7/2016
CA 3055141 A1 3/2020
(Continued)

OTHER PUBLICATIONS

Machine Translation of AU 2014354005 B8 PDF File Name: "AU2014354005B8_Machine_Translation.pdf" (Year: 2016).*
(Continued)

*Primary Examiner* — Grant Moubry
*Assistant Examiner* — Ruben Picon-Feliciano
(74) *Attorney, Agent, or Firm* — Troutman Pepper Locke LLP; James E. Armstrong, IV; Joshua L. Jones

(57) ABSTRACT

A control system for a work vehicle includes a first operation command unit that outputs a first operation command to operate a steering device of a work vehicle in a first steering direction, in a stopped state of the work vehicle, a state monitoring unit that monitors a state of the steering device, a restriction determination unit that determines whether to restrict operation of the steering device in the first steering direction, based on the state during output of the first operation command, and a restriction command unit that restricts the operation of the steering device in the first steering direction, based on the determination by the restriction determination unit.

16 Claims, 14 Drawing Sheets

(56) References Cited

U.S. PATENT DOCUMENTS

| | | | |
|---|---|---|---|
| 2020/0086911 A1 | 3/2020 | Stahl et al. | |
| 2020/0125108 A1* | 4/2020 | Ogihara ................. | B60K 28/10 |
| 2021/0001836 A1 | 1/2021 | Witte et al. | |
| 2022/0057805 A1 | 2/2022 | Ogihara et al. | |

FOREIGN PATENT DOCUMENTS

| | | | | |
|---|---|---|---|---|
| CN | 105102301 | A | | 11/2015 |
| CN | 111344203 | A | | 6/2020 |
| JP | H05-338547 | A | | 12/1993 |
| JP | H06-156300 | A | | 6/1994 |
| JP | H09-272451 | A | | 10/1997 |
| JP | H11291931 | A | * | 10/1999 |
| JP | 2008-174194 | A | | 7/2008 |
| JP | 2015013498 | A | | 1/2015 |
| JP | 2018018419 | A | * | 2/2018 |
| JP | 2019-101688 | A | | 6/2019 |
| JP | 6649852 | B2 | * | 2/2020 |
| JP | 2020-125783 | A | | 8/2020 |

OTHER PUBLICATIONS

Machine Translation of JP 2018018419 A PDF File Name: "JP2018018419A_Machine_Translation.pdf" (Year: 2018).*

Machine Translation of JP H11291931 A PDF File Name: "JPH11291931A_Machine_Translation.pdf" (Year: 1999).*

Machine Translation of JP 6649852 B2 PDF File Name: "JP6649852B2_Machine_Translation.pdf" (Year: 2020).*

Office Action issued in Canadian Patent Application No. CA 3,238,777, mailed Nov. 3, 2025.

Office Action issued in corresponding Chinese Patent Application No. CN 202280075755.0, mailed Jul. 10, 2026, with machine translation.

* cited by examiner

[LOW LOAD STATE (NO-LOAD STATE)]

[HIGH LOAD STATE (LOADED STATE)]

CONTROL SYSTEM FOR WORK VEHICLE AND CONTROL METHOD FOR WORK VEHICLE

FIELD

The present disclosure relates to a control system for a work vehicle and a control method for a work vehicle.

BACKGROUND

In a technical field related to a work vehicle, an unmanned vehicle is known that includes a steering device as disclosed in Patent Literature 1.

CITATION LIST

Patent Literature

Patent Literature 1: JP 2020-125783 A

SUMMARY

Technical Problem

In some cases, the steering device is operated while the work vehicle is in a stopped state. The operation of the steering device while a high load is applied to the steering device may cause deterioration of the steering device.

An object of the present disclosure is to suppress deterioration of a steering device.

Solution to Problem

In order to achieve an aspect of the present invention, a control system for a work vehicle comprises: a first operation command unit that outputs a first operation command to operate a steering device of a work vehicle in a first steering direction, in a stopped state of the work vehicle; a state monitoring unit that monitors a state of the steering device; a restriction determination unit that determines whether to restrict operation of the steering device in the first steering direction, based on the state during output of the first operation command; and a restriction command unit that restricts the operation of the steering device in the first steering direction, based on the determination by the restriction determination unit.

Advantageous Effects of Invention

According to the present disclosure, deterioration of the steering device is suppressed.

DESCRIPTION OF EMBODIMENTS

Embodiments according to the present disclosure will be described below with reference to the drawings, but the present disclosure is not limited to the embodiments. Component elements according to the embodiments described below may be appropriately combined with each other. Furthermore, some of the component elements are not used in some cases.

[Work Site]

Figure 1:
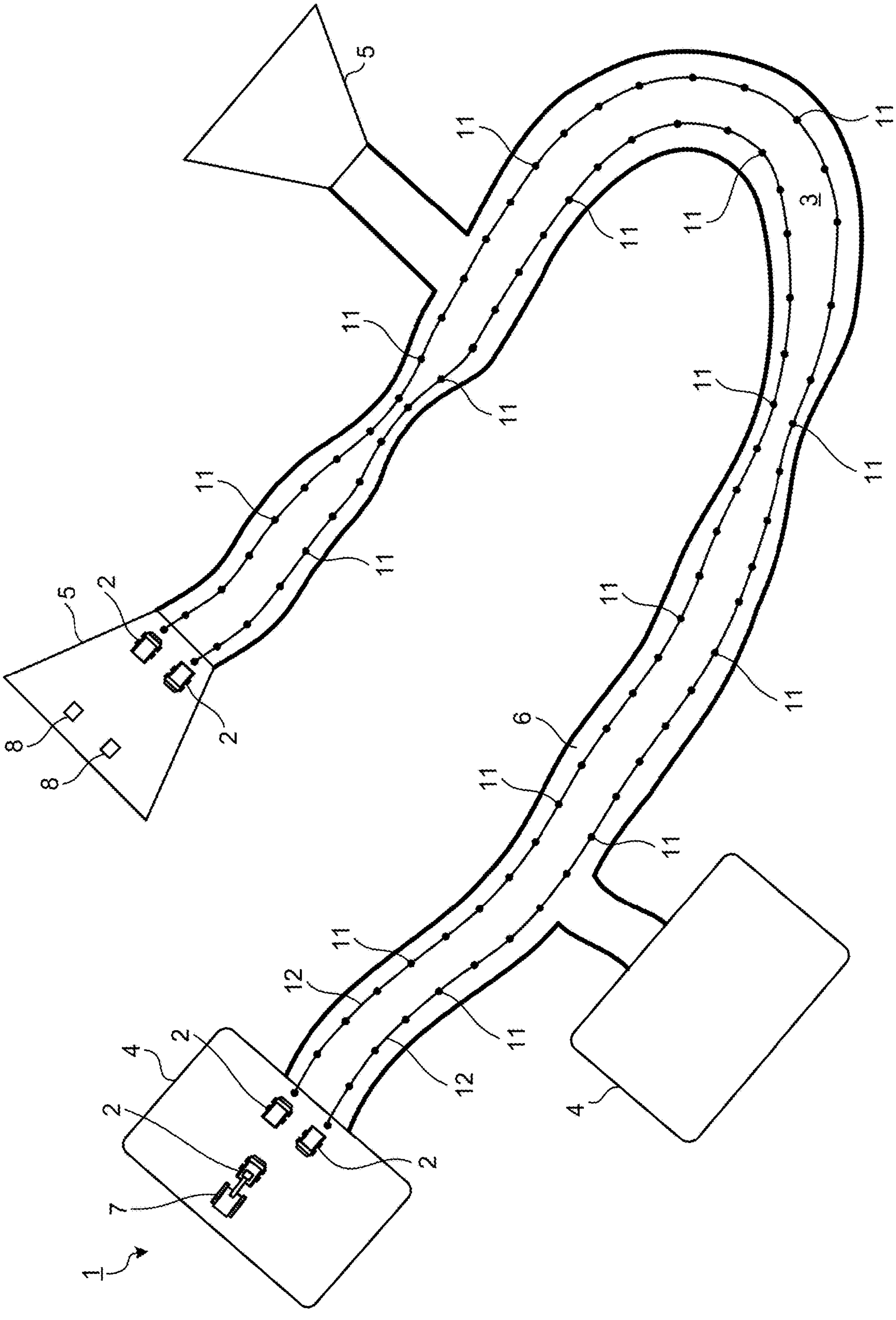
FIG. 1 is a diagram schematically illustrating a work site for a work vehicle according to an embodiment.

FIG. 1 is a diagram schematically illustrating a work site 1 for a work vehicle 2 according to an embodiment.

In the embodiment, the work site 1 represents a mine. The mine represents a place or a business facility for mining a mineral. Examples of the mine include a metal mine where metal is mined, a non-metal mine where limestone is mined, or a coal mine where mining coal is mined. Note that the work site 1 may be a quarry. The quarry represents a place or business facility for mining a stone material.

On the work site 1, a plurality of the work vehicles 2 is operated. An example of the work vehicles 2 includes haulage vehicles that travel on the work site 1 and transport loads. An example of the loads to be transported by the work vehicles 2 includes excavated objects after mining on the work site 1.

In the embodiment, each of the work vehicle 2 is an unmanned vehicle that is operated in an unmanned manner without depending on the driving operation by a driver. In the embodiment, the work vehicle 2 is an unmanned dump truck that travels on the work site 1 in an unmanned manner to transport the load.

A travel area 3 is set on the work site 1. The travel area 3 represents an area in which the work vehicle 2 is allowed to travel. The travel area 3 includes a loading place 4, a dumping place 5, and a travel course 6.

The loading place 4 represents an area where loading work to load the work vehicle 2 is performed. In the loading place 4, a loader 7 operates. An example of the loader 7 includes an excavator.

The dumping place 5 represents an area where dumping work for unloading the load from the work vehicle 2 is performed. A crusher 8 is placed in the dumping place 5.

The travel course 6 represents an area where the work vehicle 2 travels toward at least one of the loading place 4 and the dumping place 5. The travel course 6 is provided to connect the loading place 4 and the dumping place 5. The work vehicle 2 travels along the travel course 6 to reciprocate between the loading place 4 and the dumping place 5.

[Management System]

Figure 2:
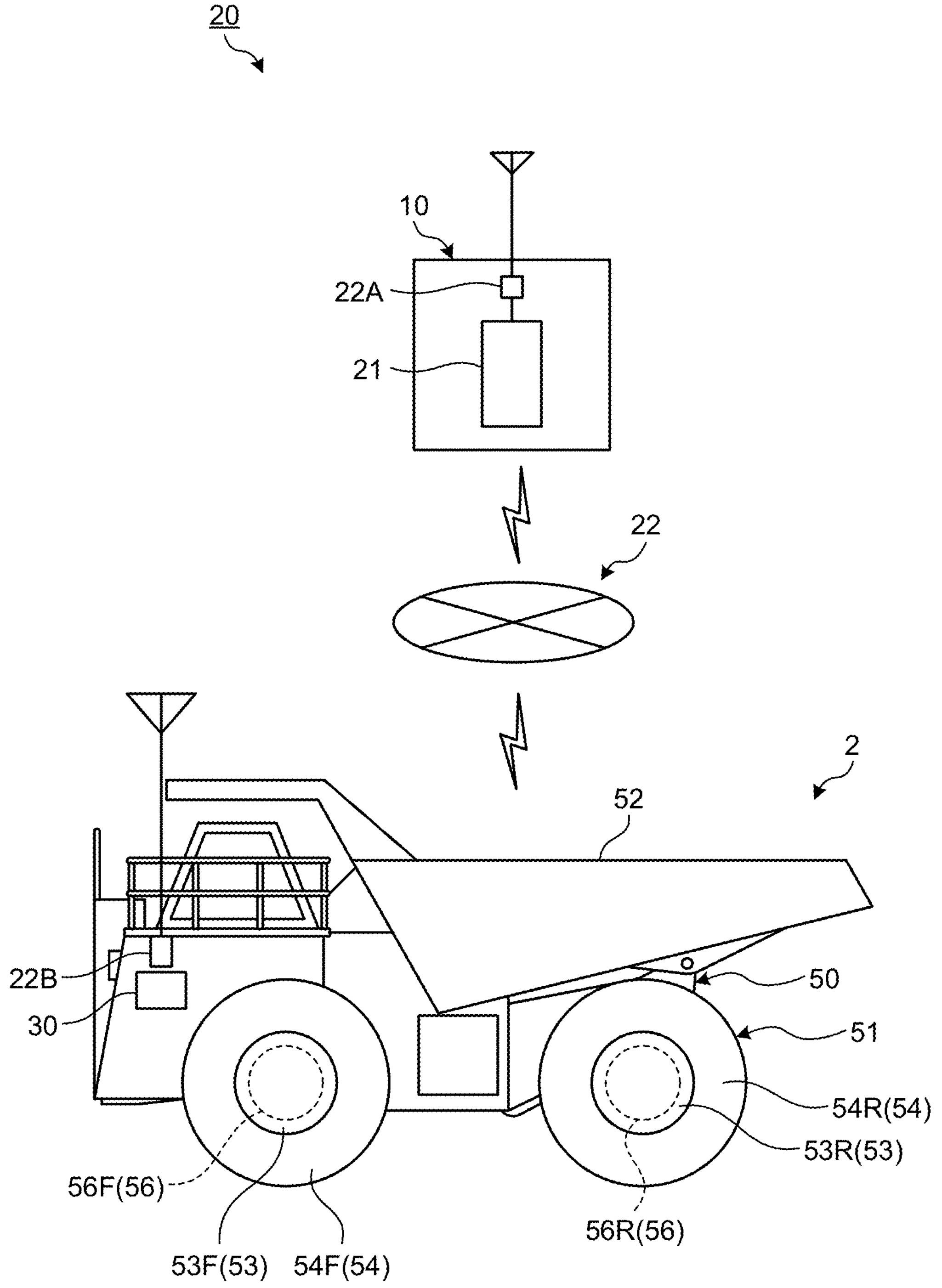
FIG. 2 is a diagram schematically illustrating a management system for the work site according to an embodiment.

FIG. 2 is a diagram schematically illustrating a management system 20 for the work site 1 according to an embodiment.

The management system 20 manages at least an operation state of the work vehicle 2. The management system 20 includes a management device 21 and a communication system 22. The management device 21 is installed in a control facility 10 on the work site 1. The management device 21 includes a computer system. Examples of the communication system 22 include the Internet, a mobile phone communication network, a satellite communication network, or a local area network (LAN).

The work vehicle 2 includes a control device 30. The control device 30 includes a computer system. The management device 21 and the control device 30 of the work vehicle 2 wirelessly communicate with each other via the communication system 22. A wireless communication device 22A is connected to the management device 21. A wireless communication device 22B is connected to the control device 30. The communication system 22 includes the wireless communication device 22A and the wireless communication device 22B.

In the embodiment, the management device 21 generates travel data indicating travel conditions of the work vehicle 2. The traveling conditions of the work vehicle 2 include a target position of the work vehicle 2, a target traveling speed of the work vehicle 2, and a target orientation of the work vehicle 2. The travel data generated by the management device 21 is transmitted to the work vehicle 2 via the communication system 22. The work vehicle 2 travels in the travel area 3 on the basis of the travel data transmitted from the management device 21.

As illustrated in FIG. 1, the travel data is defined by a travel point 11 and a travel path 12. A plurality of the travel points 11 are set in the travel area 3. The plurality of the travel points 11 are set at intervals. Each of the travel points 11 defines the target position of the work vehicle 2. The target position of the work vehicle 2 represents a target position of the work vehicle 2 passing the travel point 11. The target traveling speed of the work vehicle 2 and the target orientation of the work vehicle 2 are set at each of the plurality of the travel points 11. The target traveling speed of the work vehicle 2 represents a target traveling speed of the work vehicle 2 passing the travel point 11. The target orientation of the work vehicle 2 represents a target orientation of the work vehicle 2 passing the travel point 11. The travel path 12 defines a target travel route of the work vehicle 2. The travel path 12 is defined by an imaginary line passing through the plurality of the travel points 11.

[Work Vehicle]

Figure 3:
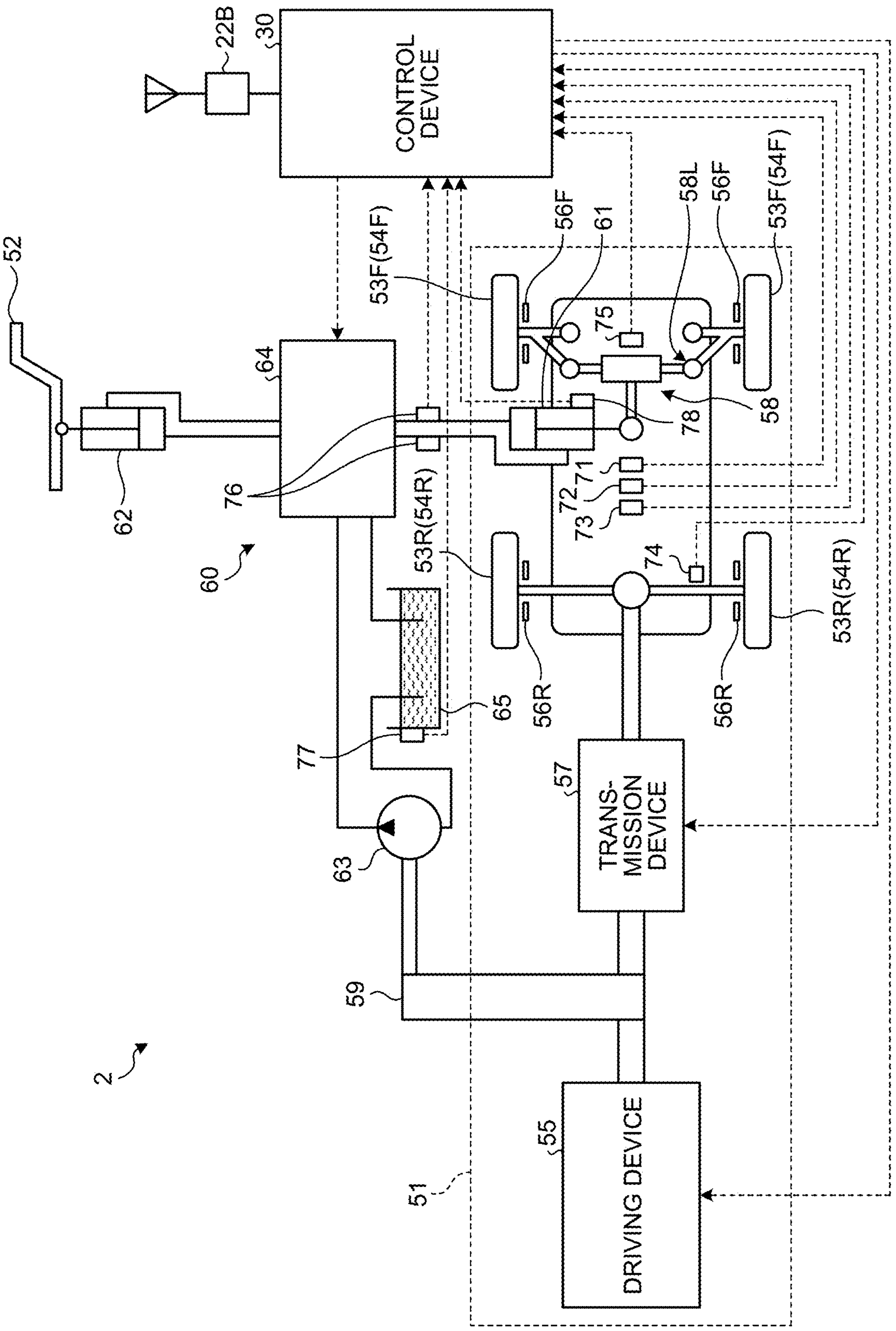
FIG. 3 is a configuration diagram of a work vehicle according to an embodiment.
Figure 4:
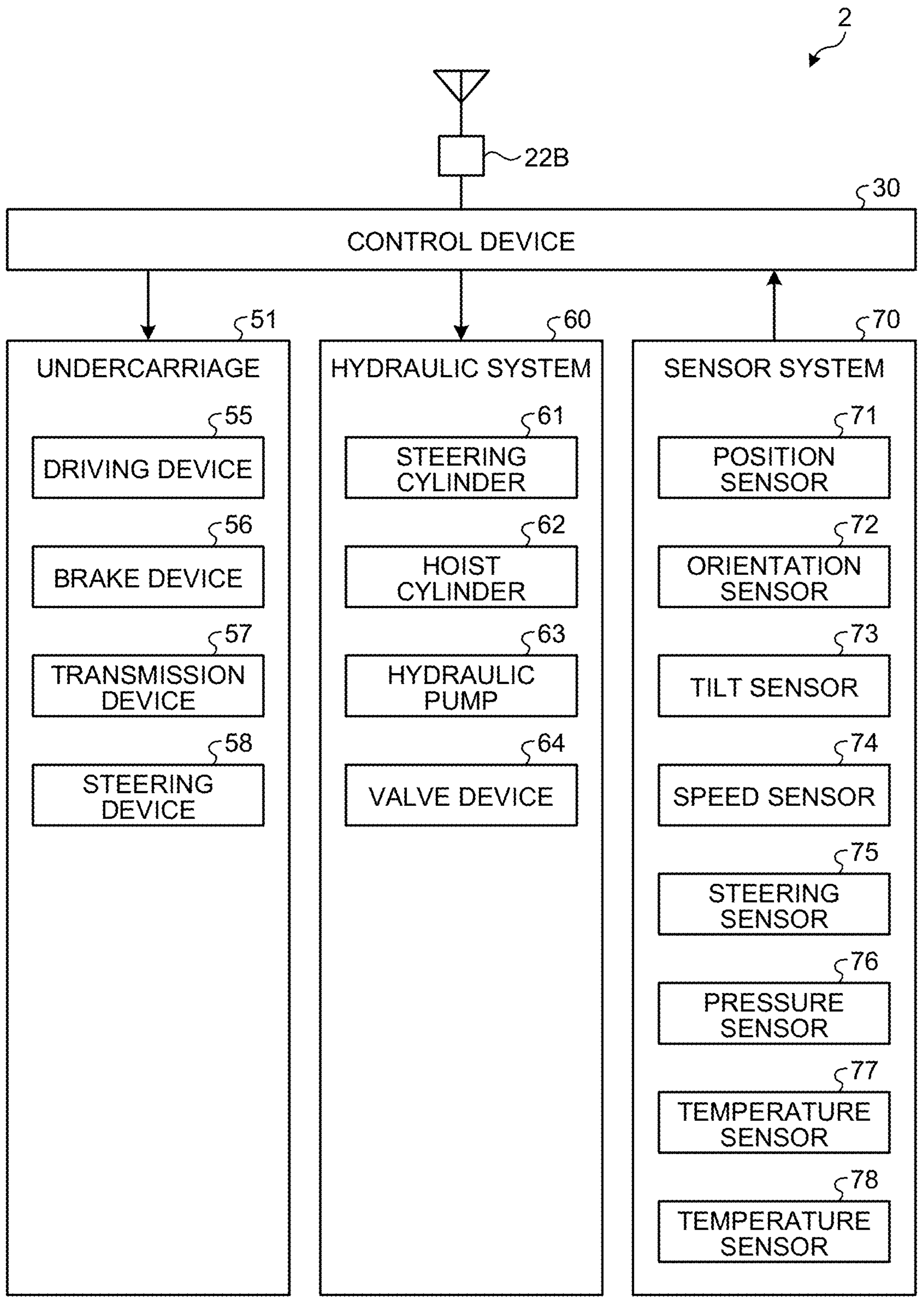
FIG. 4 is a block diagram illustrating the work vehicle according to an embodiment.

FIG. 3 is a configuration diagram of the work vehicle 2 according to an embodiment. FIG. 4 is a block diagram illustrating the work vehicle 2 according to an embodiment.

As illustrated in FIGS. 2, 3, and 4, the work vehicle 2 includes the wireless communication device 22B, the control device 30, a vehicle body 50, an undercarriage 51, a dump body 52, a hydraulic system 60, and a sensor system 70.

The vehicle body 50 includes a vehicle body frame. The vehicle body 50 is supported by the undercarriage 51. The vehicle body 50 supports the dump body 52.

The undercarriage 51 causes the work vehicle 2 to travel. The undercarriage 51 moves the work vehicle 2 forward or backward. At least part of the undercarriage 51 is placed below the vehicle body 50. The undercarriage 51 includes wheels 53, tires 54, a driving device 55, brake devices 56, a transmission device 57, and a steering device 58.

Each of the wheels 53 is rotatably supported at least at a portion of the vehicle body 50. The tires 54 are mounted on the wheels 53. When the wheels 53 rotate with the tires 54 in contact with a road surface on the work site, the work vehicle 2 travels through the work site 1. The wheels 53 include front wheels 53F and rear wheels 53R. The tires 54 include front tires 54F that are mounted on the front wheels 53F and rear tires 54R that are mounted on the rear wheels 53R.

The driving device 55 generates a driving force to start or accelerate the work vehicle 2. Examples of the driving device 55 include an internal combustion engine or an electric motor. An example of the internal combustion engine includes a diesel engine.

Each of the brake devices 56 generates a braking force to decelerate or stop the work vehicle 2. Examples of the brake device 56 include a disc brake or a drum brake. The brake devices 56 include front brakes 56F for stopping the rotation of the front wheels 53F and rear brakes 56R for stopping the rotation of the rear wheels 53R.

The transmission device 57 transmits the driving force generated by the driving device 55 to the wheels 53. Part of the driving force generated by the driving device 55 is transmitted to the transmission device 57 via a transfer mechanism 59. The wheels 53 are rotated by the driving force generated by the driving device 55.

The steering device 58 generates a steering force for adjusting a travel direction of the work vehicle 2. The steering device 58 steers corresponding wheels 53. The corresponding wheels 53 are steered to adjust the traveling direction of the work vehicle 2.

The wheels 53 include driving wheels to which the driving force from the transmission device 57 is transmitted and steered wheels that are steered by the steering device 58. In the embodiment, the driving wheels are the rear wheels 53R. The steered wheels are the front wheels 53F.

The dump body 52 is a member to be loaded. At least part of the dump body 52 is placed above the vehicle body 50. The dump body 52 performs a dumping operation and a lowering operation. The dump body 52 is adjusted to a dumping attitude and a loading attitude by the dumping operation and the lowering motion. The dumping operation represents an operation of raising the dump body 52 from the vehicle body 50 so that the dump body 52 is inclined in a dumping direction. In the embodiment, the dumping direction is oriented rearward from the vehicle body 50. The dumping attitude represents an attitude in which the dump body 52 is raised. The lowering operation represents an operation of lowering the dump body 52 so that the dump body 52 approaches the vehicle body 50. The loading attitude represents an attitude in which the dump body 52 is lowered. In the dumping work, the dump body 52 performs the dumping operation to change the loading attitude to the dumping attitude. The dumping operation of the dump body 52 unloads the load on the dump body 52 from the dump body 52, in the dumping direction. In the loading work, the dump body 52 is adjusted to the loading attitude.

The hydraulic system 60 includes a steering cylinder 61, a hoist cylinder 62, a hydraulic pump 63, a valve device 64, and a hydraulic oil tank 65.

The steering cylinder 61 generates the steering force to steer the front wheels 53F, in the steering device 58. The steering cylinder 61 is a hydraulic cylinder. The steering device 58 includes the steering cylinder 61. The steering device 58 includes a link mechanism 58L connected to the front wheels 53F. The front wheels 53F are connected to the steering cylinder 61 via the link mechanism 58L. The steering cylinder 61 drives the link mechanism 58L on the basis of hydraulic oil supplied from the hydraulic pump 63. When the steering cylinder 61 extends and retracts, the link mechanism 58L is driven to steer the front wheels 53F. The steering cylinder 61 includes a bottom chamber and a head chamber. When the hydraulic oil is supplied to the bottom chamber, the steering cylinder 61 extends. When the hydraulic oil is supplied to the head chamber, the steering cylinder 61 retracts. For example, when the steering cylinder 61 extends, the front wheels 53F are steered leftward, and when the steering cylinder 61 retracts, the front wheels 53F are steered rightward.

The hoist cylinder 62 generates a hoisting force to operate the dump body 52. The hoist cylinder 62 is a hydraulic cylinder. The dump body 52 is connected to the hoist cylinder 62. When the hoist cylinder 62 extends and retracts, the dump body 52 performs the dumping operation and the lowering operation. The hoist cylinder 62 has a bottom chamber and a head chamber. When the hydraulic oil is supplied to the bottom chamber, the hoist cylinder 62 extends. When the hydraulic oil is supplied to the head chamber, the hoist cylinder 62 retracts. For example, when the hoist cylinder 62 extends, the dump body 52 performs the dumping operation, and when the hoist cylinder 62 retracts, the dump body 52 performs the lowering operation.

The hydraulic pump 63 is operated by the driving force generated by the driving device 55. Part of the driving force generated by the driving device 55 is transmitted to the hydraulic pump 63 via the transfer mechanism 59. The hydraulic pump 63 dispenses hydraulic oil for extending and retracting each of the steering cylinder 61 and the hoist cylinder 62.

The valve device 64 adjusts a circulation state of the hydraulic oil supplied to each of the steering cylinder 61 and the hoist cylinder 62. The valve device 64 operates on the basis of a control command from the control device 30. The valve device 64 is operable to adjust a flow rate and direction of the hydraulic oil supplied to the steering cylinder 61. The valve device 64 is operable to adjust a flow rate and direction of the hydraulic oil supplied to the hoist cylinder 62. The steering cylinder 61 extends and retracts by the hydraulic oil supplied from the hydraulic pump 63 via the valve device 64. The hoist cylinder 62 extends and retracts by the hydraulic oil supplied from the hydraulic pump 63 via the valve device 64.

The hydraulic oil tank 65 stores the hydraulic oil. The hydraulic pump 63 sucks the hydraulic oil stored in the hydraulic oil tank 65 and dispenses the hydraulic oil from an outlet. The hydraulic oil flowing out of each of the steering cylinder 61 and the hoist cylinder 62 is returned to the hydraulic oil tank 65 via the valve device 64.

The sensor system 70 includes a position sensor 71, an orientation sensor 72, a tilt sensor 73, a speed sensor 74, a steering sensor 75, a pressure sensor 76, a temperature sensor 77, and a temperature sensor 78.

The position sensor 71 detects the position of the work vehicle 2. An example of a position detection method for the work vehicle 2 includes a detection method using a global navigation satellite system (GNSS). Upon detection of the position of the work vehicle 2 by using GNSS, the position sensor 71 includes a GNSS receiver to detect the position of the work vehicle 2 in a global coordinate system.

The orientation sensor 72 detects the orientation of the work vehicle 2. An example of the orientation sensor 72 includes a gyro sensor.

The tilt sensor 73 detects an attitude of the work vehicle 2. The attitude of the work vehicle 2 includes a tilt angle of the vehicle body 50. An example of the tilt sensor 73 includes an inertial measurement unit (IMU).

The speed sensor 74 detects the traveling speed of the work vehicle 2. An example of the speed sensor 74 includes a pulse sensor that detects the rotation of a wheel 53.

The steering sensor 75 detects a steering angle of the steering device 58. An example of the steering sensor 75 includes a potentiometer.

The pressure sensor 76 detects a pressure of hydraulic oil in the steering cylinder 61. A pair of the pressure sensors 76 is provided. One of the pressure sensors 76 detects a pressure of hydraulic oil in the bottom chamber of the steering cylinder 61. The other of the pressure sensors 76 detects a pressure of hydraulic oil in the head chamber of the steering cylinder 61.

The temperature sensor 77 detects a temperature of the hydraulic oil stored in the hydraulic oil tank 65.

The temperature sensor 78 detects a temperature of hydraulic oil in the steering device 58. The temperature sensor 78 detects, for example, a temperature of the hydraulic oil in the steering cylinder 61.

The control device 30 is placed in the vehicle body 50. The control device 30 outputs a control command to control the undercarriage 51. The control device 30 outputs a control command to operate at least one of the driving device 55, each of the brake devices 56, the transmission device 57, and the steering device 58.

[Control System]

Figure 5:
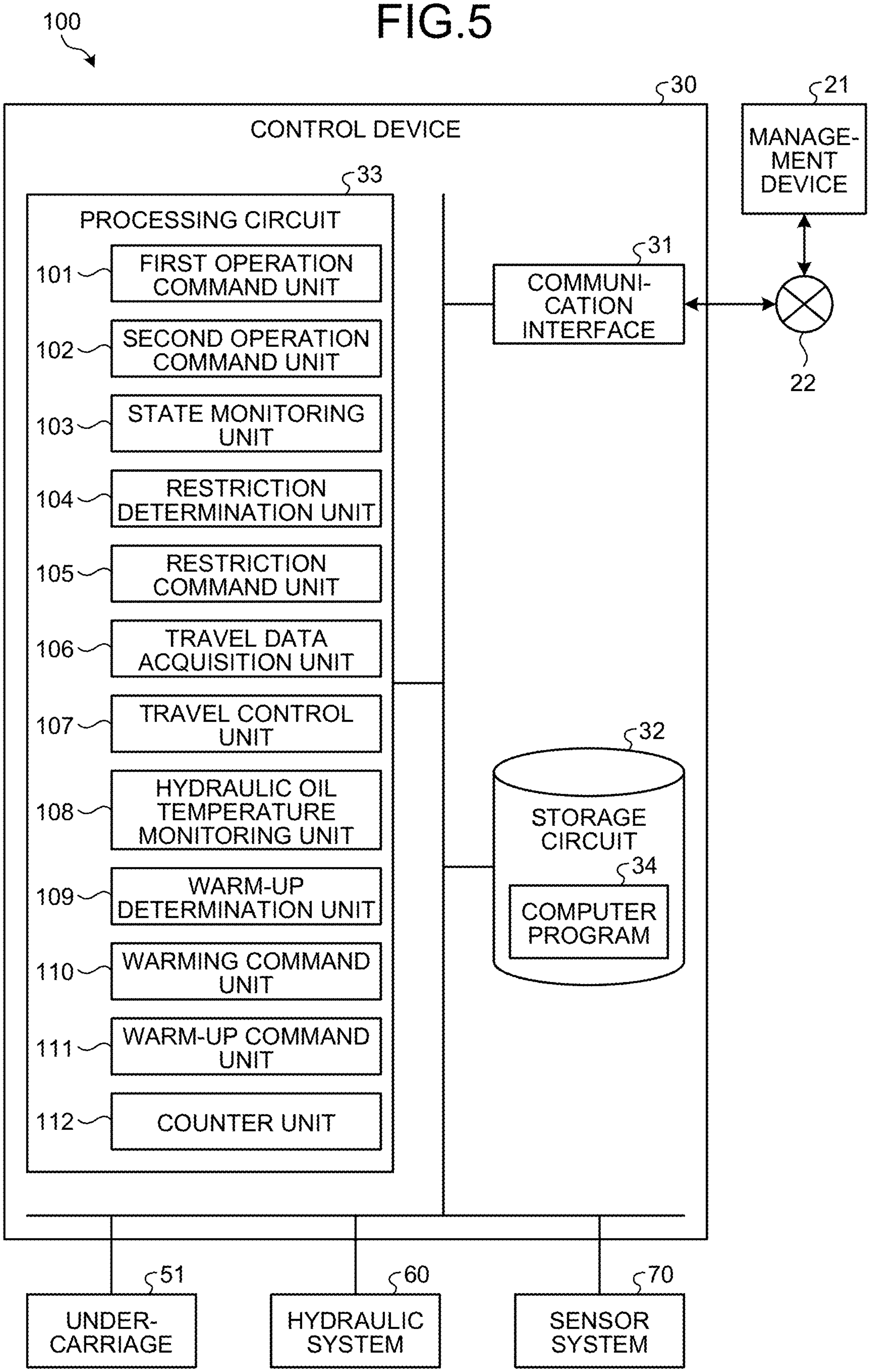
FIG. 5 is a functional block diagram illustrating a control system for the work vehicle according to an embodiment.

FIG. 5 is a functional block diagram illustrating a control system 100 for the work vehicle 2 according to an embodiment.

The control system 100 includes the control device 30, the undercarriage 51, the hydraulic system 60, and the sensor system 70.

The control device 30 includes the computer system. The control device 30 includes a communication interface 31, a storage circuit 32, and a processing circuit 33.

The communication interface 31 is connected to the processing circuit 33. The communication interface 31 controls communication between the control device 30 and the management device 21. The communication interface 31 communicates with the management device 21 via the communication system 22.

The storage circuit 32 is connected to the processing circuit 33. The storage circuit 32 stores data. Examples of the storage circuit 32 include a nonvolatile memory or a volatile memory. Examples of the nonvolatile memory include a read only memory (ROM) or a storage. Examples of the storage include a hard disk drive (HDD) or a solid state drive (SSD). An example of the volatile memory includes a random access memory (RAM).

The processing circuit 33 performs arithmetic processing and control command output processing. An example of the processing circuit 33 includes a processor. Examples of the processor include a central processing unit (CPU) or a micro processing unit (MPU). A computer program 34 is stored in the storage circuit 32. The processing circuit 33 executes the computer program 34 acquired from the storage circuit 32 to achieve a predetermined function.

The processing circuit 33 includes a first operation command unit 101, a second operation command unit 102, a state monitoring unit 103, a restriction determination unit 104, a restriction command unit 105, a travel data acquisition unit 106, a travel control unit 107, a hydraulic oil temperature monitoring unit 108, a warm-up determination unit 109, a warming command unit 110, a warm-up command unit 111, and a counter unit 112.

The first operation command unit 101 outputs a first operation command Ca to operate the steering device 58 of the work vehicle 2 in a first steering direction while the work vehicle 2 is in a stopped state.

After the operation of the steering device 58 in the first steering direction is restricted, the second operation command unit 102 outputs a second operation command Cb to operate the steering device 58 in a second steering direction opposite to the first steering direction in the stopped state of the work vehicle 2.

The state monitoring unit 103 monitors a state of the steering device 58. In the embodiment, the state of the steering device 58 includes an operation state of the steering device 58.

The restriction determination unit 104 determines whether to restrict the operation of the steering device 58 in the first steering direction, on the basis of the state of the steering device 58 during output of the first operation command Ca from the first operation command unit 101. In the embodiment, restriction of the operation of the steering device 58 includes stopping the operation of the steering device 58.

The restriction command unit 105 restricts the operation of the steering device 58 in the first steering direction, on the basis of the determination by the restriction determination unit 104.

The travel data acquisition unit 106 acquires the travel data transmitted from the management device 21.

The travel control unit 107 controls the undercarriage 51, on the basis of the travel data. The travel control unit 107 controls the undercarriage 51 so that the work vehicle 2 is brought into the stopped state or a traveling state.

The hydraulic oil temperature monitoring unit 108 monitors the temperature of the hydraulic oil in the hydraulic system 60.

The warm-up determination unit 109 determines whether to perform a warming process for the hydraulic oil stored in the hydraulic oil tank 65, on the basis of the temperature of the hydraulic oil. The warm-up determination unit 109 determines whether to perform a warm-up process for the steering device 58, on the basis of the temperature of the hydraulic oil.

The warming command unit 110 outputs a warming command to perform the warming process for the hydraulic oil stored in the hydraulic oil tank 65, on the basis of the determination by the warm-up determination unit 109.

The warm-up command unit 111 outputs a warm-up command to perform the warm-up process for the steering device 58, on the basis of the determination by the warm-up determination unit 109.

The counter unit 112 sets a counter te.

[Stationary Steering Operation]

Figure 6:
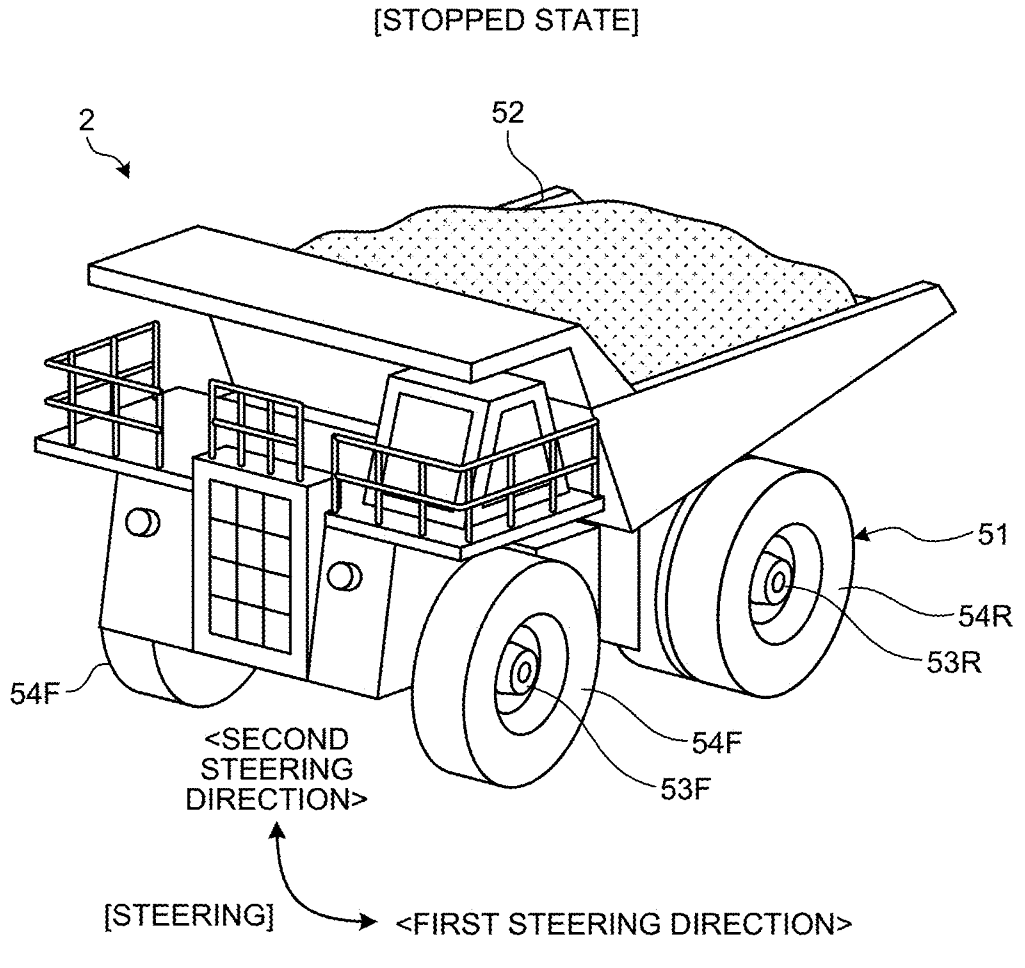
FIG. 6 is a diagram illustrating an operation of the work vehicle according to an embodiment.

FIG. 6 is a diagram illustrating an operation of the work vehicle 2 according to an embodiment.

As illustrated in FIG. 6, the steering device 58 may be operated while the work vehicle 2 is in the stopped state. The stopped state of the work vehicle 2 includes a stopped state of the rotation of the wheels 53 in the work vehicle 2. In the following description, the operation of the steering device 58 in the stopped state of the work vehicle 2 is appropriately referred to as a stationary steering operation.

Each of the first operation command unit 101 and the second operation command unit 102 outputs the operation command to cause the steering device 58 to perform the stationary steering operation. The first operation command unit 101 outputs the first operation command Ca to cause the steering device 58 to operate in the first steering direction in the stopped state of the work vehicle 2. The second operation command unit 102 outputs the second operation command Cb to cause the steering device 58 to operate in the second steering direction opposite to the first steering direction in the stopped state of the work vehicle 2.

In the embodiment, it is assumed that the first steering direction is a left direction and the second steering direction is a right direction. When the first operation command Ca is output from the first operation command unit 101, the steering device 58 operates so that the front wheels 53F are steered leftward in the stopped state of the work vehicle 2. When the second operation command Cb is output from the second operation command unit 102, the steering device 58 operates so that the front wheels 53F are steered rightward in the stopped state of the work vehicle 2.

Alternately outputting the first operation command Ca and the second operation command Cb steers the front wheels 53F to reciprocally move leftward and rightward in the stopped state of the work vehicle 2.

The state monitoring unit 103 monitors a state of the steering device 58. The state of the steering device 58 includes the operation state of the steering device 58. The operation state of the steering device 58 includes the steering angle of the steering device 58. Furthermore, the operation state of the steering device 58 includes an operation speed of the steering device 58. The operation speed of the steering device 58 includes an amount of change [rad/sec.] in the steering angle per unit time. In other words, the operation speed of the steering device 58 indicates a steering speed.

The state monitoring unit 103 acquires detection data from the steering sensor 75. As described above, the steering sensor 75 detects the steering angle of the steering device 58. The state monitoring unit 103 acquires the detection data from the steering sensor 75 to monitor the steering angle of the steering device 58. The state monitoring unit 103 performs arithmetic processing on the basis of the detection data from the steering sensor 75 to monitor the operation speed of the steering device 58.

The restriction determination unit 104 determines whether to restrict the operation of the steering device 58 in the first steering direction, on the basis of the state of the steering device 58 during the output of the first operation command Ca from the first operation command unit 101. In the embodiment, the restriction determination unit 104 determines whether to stop the operation of the steering device 58 in the first steering direction, on the basis of the operation state of the steering device 58 monitored by the state monitoring unit 103.

The restriction command unit 105 restricts the operation of the steering device 58 in the first steering direction, on the basis of the determination by the restriction determination unit 104. As described above, restricting the operation of the steering device 58 includes stopping the operation of the steering device 58. When the restriction determination unit 104 determines to stop the operation of the steering device 58 in the first steering direction, the restriction command unit 105 stops the operation of the steering device 58 in the first steering direction. When the restriction determination unit 104 determines not to stop the operation of the steering device 58 in the first steering direction, the restriction command unit 105 does not stop the operation of the steering device 58 in the first steering direction.

Figure 7:
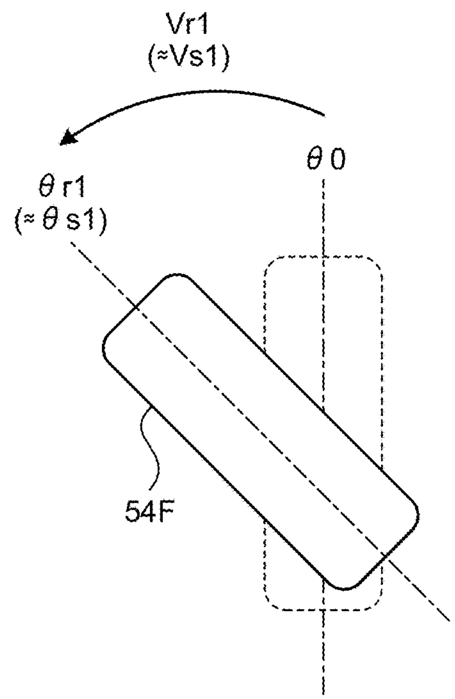
FIG. 7 is a diagram illustrating an example of an operation of a front tire during an output of a first operation command according to an embodiment.

FIG. 7 is a diagram illustrating an example of the operation of a front tire 54F during an output of the first operation command Ca according to an embodiment.

In the example illustrated in FIG. 7, the ground in contact with a front tire 54F is assumed to be, for example, a dry flat surface. Furthermore, in the example illustrated in FIG. 7, the dump body 52 is in an unloaded state in which no load is loaded. In the example illustrated in FIG. 7, a load applied to the front tire 54F is low. The load applied to the front tire 54F includes the weight of the vehicle applied to the front tire 54F, and a resistance force from the ground while the front tire 54F is steered. The load applied to the front tire 54F is low, and therefore, a load applied to the steering device 58 while the front tire 54F is steered is low. The steering device 58 operates in a low load state. The front tire 54F is steered in the low load state.

The first operation command unit 101 outputs the first operation command Ca so that the steering device 58 operates in a target state. The target state of the steering device 58 includes a first target speed Vr1 that indicates a target value of the operation speed. The target state of the steering device 58 includes a first target angle θr1 that indicates a target value of a maximum steering angle. The first operation command unit 101 outputs the first operation command Ca so that the steering device 58 operates in the first steering direction at the first target speed Vr1 to the first target angle θr1. In the embodiment, the first target angle θr1 is a maximum movable angle of the steering device 58. When a reference angle θ0 that indicates the steering angle while the undercarriage 51 is traveling straight is set to 0 degrees, the first target angle θr1 is, for example, 35 [°] from the reference angle θ0, in the first steering direction. The first target speed Vr1 is, for example, 5 [rad/sec.] or more and 7 [rad/sec.] or less. The first target angle θr1 may not be 35 [°]. The first target speed Vr1 may not be 5 [rad/sec.] or more and 7 [rad/sec.] or less.

When the load applied to the steering device 58 is low, the steering device 58 is operable in the target state, on the basis of the first operation command Ca. An actual operation speed Vs1 of the steering device 58 acquired by the state monitoring unit 103 is substantially equal to the first target speed Vr1. An actual steering angle θs1 of the steering device 58 acquired by the state monitoring unit 103 when the operation of the steering device 58 is finished is substantially equal to the first target angle θr1.

Figure 8:
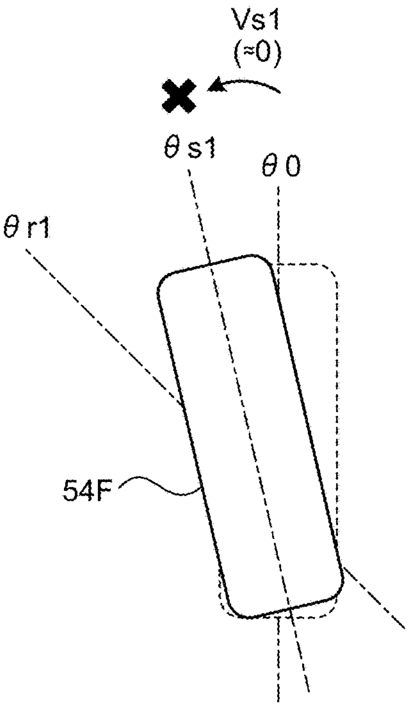
FIG. 8 is a diagram illustrating an example of an operation of the front tire during the output of the first operation command according to an embodiment.

FIG. 8 is a diagram illustrating an example of the operation of the front tire 54F during the output of the first operation command Ca according to an embodiment.

In the example illustrated in FIG. 8, the dump body 52 is in a loaded state in which the load is loaded as illustrated in FIG. 6. In the example illustrated in FIG. 8, the weight of the vehicle applied to the front tire 54F is large, and therefore, the load applied to the front tire 54F is high. The load applied to the front tire 54F is high, and therefore, the load applied to the steering device 58 while the front tire 54F is steered is high. The steering device 58 operates in a high load state. The front tire 54F is steered in the high load state.

When the load applied to the steering device 58 is high, it may be difficult for the steering device 58 to operate in the target state even if the first operation command Ca is output from the first operation command unit 101.

As illustrated in FIG. 8, when the load applied to the steering device 58 is high, there is a possibility that the steering device 58 cannot operate to the first target angle θr1 and substantially stops at the steering angle θs1 smaller than the first target angle θr1, even when the first operation command Ca is output from the first operation command unit 101. In other words, due to the high load applied to the steering device 58, there is a possibility that the steering device 58 cannot move before reaching the first target angle θr1. In this case, the actual operation speed Vs1 of the steering device 58 acquired by the state monitoring unit 103 becomes substantially 0 before the steering device 58 reaches the first target angle θr1.

Even when a situation occurs where the steering device 58 substantially stops due to the high load applied to the steering device 58, there is a possibility that an excessively high load may be applied to the steering device 58, when the first operation command Ca is continuously output from the first operation command unit 101. This configuration may result in deterioration of the steering device 58. For example, when the first operation command Ca to operate the steering cylinder 61 is continuously output even though the link mechanism 58L of the steering device 58 cannot move, there is a possibility that an excessively high load is applied to the link mechanism 58L. This configuration may result in the deterioration of the link mechanism 58L, reducing the life of the steering device 58. In addition, even when a situation occurs where the steering device 58 substantially stops, there is a possibility that an excessively high load may be applied also to the front tire 54F, when the first operation command Ca is continuously output from the first operation command unit 101. This configuration may result in the wearing or deterioration of the front tire 54F.

In order to suppress the deterioration of the steering device 58 and the deterioration of the front tire 54F, the restriction determination unit 104 determines whether to restrict the operation of the steering device 58 in the first steering direction, on the basis of the state of the steering device 58 during the output of the first operation command Ca from the first operation command unit 101.

In the embodiment, when a state in which the operation speed Vs1 during the output of the first operation command Ca is equal to or less than a determination threshold Ha continues for a determination time Ta, the restriction determination unit 104 determines that the steering device 58 is substantially stopped and determines to restrict the operation of the steering device 58 in the first steering direction. When the restriction determination unit 104 determines to restrict the operation of the steering device 58 in the first steering direction, the restriction command unit 105 causes the first operation command unit 101 to stop the output of the first operation command Ca to restrict the operation of the steering device 58 in the first steering direction. When a situation occurs where the steering device 58 stops in the middle of operation in the first steering direction, the output of the first operation command Ca from the first operation command unit 101 is stopped, and therefore, the steering device 58 is not forcibly operated. Therefore, application of the excessively high load to the steering device 58 is suppressed. Accordingly, deterioration of the steering device 58 and deterioration of the front tire 54F are suppressed.

The operation of the steering device 58 when the first operation command Ca is output has been described above with reference to FIGS. 7 and 8. The same applies to the operation of the steering device 58 when the second operation command Cb is output. The restriction determination unit 104 determines whether to restrict the operation of the steering device 58 in the second steering direction, on the basis of the state of the steering device 58 during the output of the second operation command Cb from the second operation command unit 102. The second operation command unit 102 outputs the second operation command Cb so that the steering device 58 operates in the target state. The target state of the steering device 58 includes a second target speed Vr2 that indicates the target value of the operation speed and a second target angle θr2 that indicates the target value of the maximum steering angle. The state monitoring unit 103 monitors an actual operation speed Vs2 of the steering device 58 during the output of the second operation command Cb. The restriction determination unit 104 determines whether to restrict the operation of the steering device 58 in the second steering direction, on the basis of a difference between the target state of the steering device 58 and the state of the steering device 58 monitored by the state monitoring unit 103. The restriction command unit 105 restricts the operation of the steering device 58 in the second steering direction, on the basis of the determination by the restriction determination unit 104.

Figure 9:
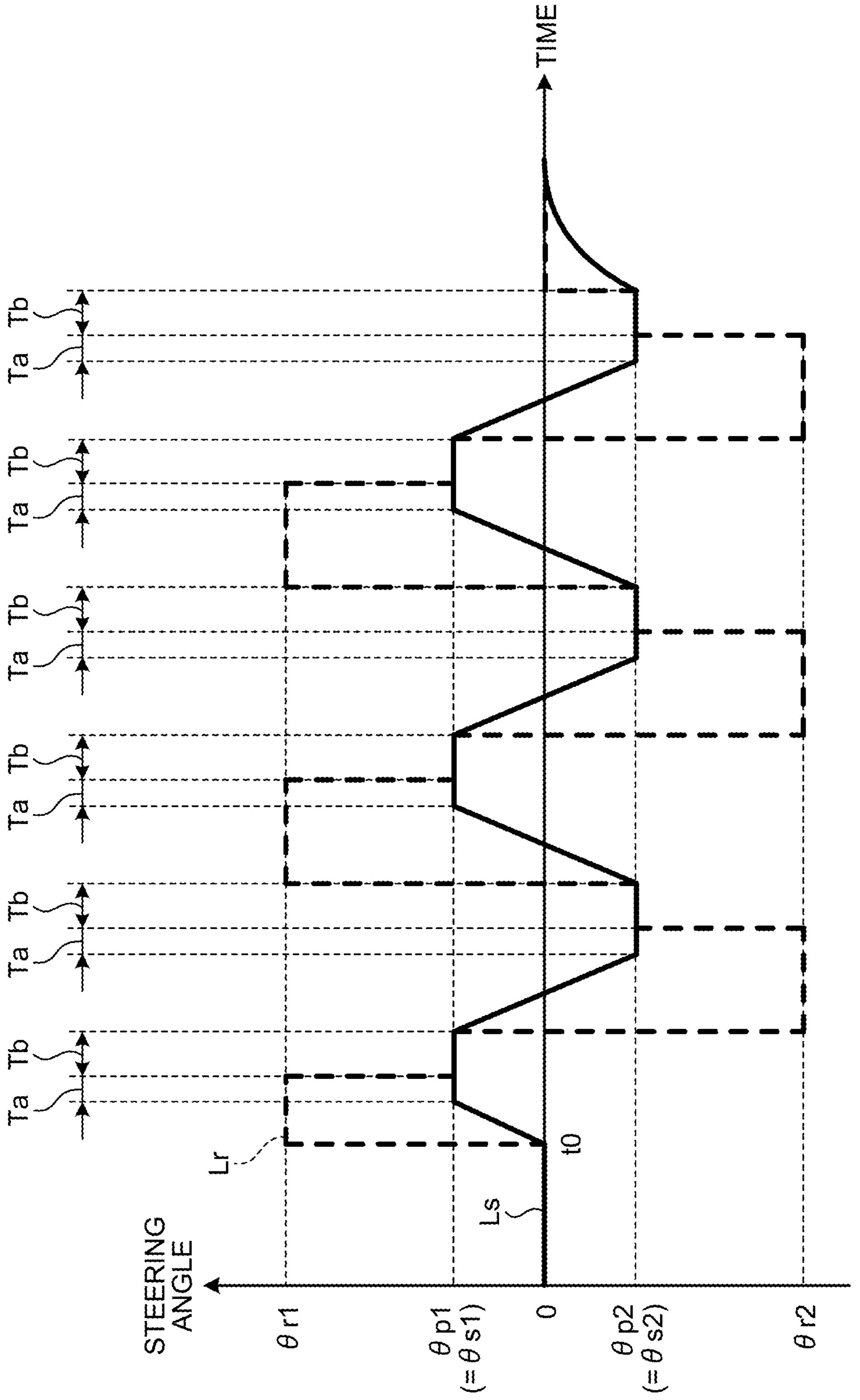
FIG. 9 is a timing chart illustrating an operation of a steering device according to an embodiment.

FIG. 9 is a timing chart illustrating the operation of the steering device 58 according to an embodiment.

FIG. 9 illustrates the timing chart where due to the operation of the steering device 58 in the high load state, the target state and operation state of the steering device 58 have a difference therebetween. In FIG. 9, the horizontal axis represents an elapsed time after the first operation command Ca is output. The vertical axis represents the steering angle of the steering device 58. A line Lr indicates a target value in the steering angle, and a line Ls indicates a detection value of the steering angle detected by the steering sensor 75.

The stationary steering operation is started at a time point t0. The first operation command unit 101 starts outputting the first operation command Ca at the time point t0. The first operation command unit 101 outputs the first operation command Ca so that the steering device 58 operates in the target state. The first operation command unit 101 outputs the first operation command Ca so that the steering device 58 operates in the first steering direction to the first target angle θr1.

When the steering device 58 operates in the high load state, the steering device 58 cannot reach the first target angle θr1 and substantially stops at the steering angle θs1 smaller than the first target angle θr1. In the embodiment, when the state in which the operation speed Vs1 during the output of the first operation command Ca is equal to or less than the determination threshold Ha continues for the determination time Ta, the restriction determination unit 104 determines that the steering device 58 is substantially stopped and determines to stop the operation of the steering device 58 in the first steering direction. Each of the determination threshold Ha and the determination time Ta, related to the operation speed Vs1, has a predetermined value. In one example, the determination threshold Ha is 0.75 [rad/sec.], and the determination time Ta is 1 [sec.].

When the restriction determination unit 104 determines to stop the operation of the steering device 58 in the first steering direction, the restriction command unit 105 stops the operation of the steering device 58 in the first steering direction. The restriction command unit 105 changes the first target angle θr1 and stops the operation of the steering device 58 in the first steering direction. In the embodiment, the state monitoring unit 103 monitors a stop angle θp1 that indicates the steering angle θs1 of the steering device 58 when the steering device 58 operated in the first steering direction on the basis of the first operation command Ca substantially stops. The stop angle θp1 is the steering angle θs1 at a time point when the restriction determination unit 104 determines that the state in which the operation speed Vs1 during the output of the first operation command Ca is equal to or less than the determination threshold Ha is continued for the determination time Ta. In other words, the stop angle θp1 is the steering angle θs1 at a time point when the steering device 58 substantially stops. The restriction command unit 105 changes the first target angle θr1 to the stop angle θp1. When the first target angle θr1 is changed to the stop angle θp1 at the time point when the steering device 58 substantially stops, the first operation command unit 101 stops the output of the first operation command Ca for further operating the steering device 58 in the first steering direction from the stop angle θp1. Stopping the output of the first operation command Ca from the first operation command unit 101 stops the operation of the steering device 58 in the first steering direction.

The restriction command unit 105 maintains a state in which the steering device 58 is placed at the stop angle θp1 until a stationary time Tb elapses after the determination time Ta has elapsed. The stationary time Tb has a predetermined value. In one example, the stationary time Tb is 3 [sec.].

After the operation of the steering device 58 in the first steering direction is stopped and the stationary time Tb has elapsed, the second operation command unit 102 outputs the second operation command Cb so that the steering device 58 operates in the target state. The second operation command unit 102 outputs the second operation command Cb so that the steering device 58 operates in the second steering direction to the second target angle θr2.

When the steering device 58 operates in the high load state, the steering device 58 cannot reach the second target angle θr2 and substantially stops at a steering angle θs2 smaller than the second target angle θr2. In the embodiment, when a state in which the operation speed Vs2 during the output of the second operation command Cb is equal to or less than the determination threshold Ha continues for the determination time Ta, the restriction determination unit 104 determines that the steering device 58 is substantially stopped and determines to stop the operation of the steering device 58 in the second steering direction.

When the restriction determination unit 104 determines to stop the operation of the steering device 58 in the second steering direction, the restriction command unit 105 stops the operation of the steering device 58 in the second steering direction. The restriction command unit 105 changes the second target angle θr2 and stops the operation of the steering device 58 in the second steering direction. In the embodiment, the state monitoring unit 103 monitors a stop angle θp2 that indicates the steering angle θs2 of the steering device 58 when the steering device 58 operated in the second steering direction on the basis of the second operation command Cb substantially stops. The stop angle θp2 is the steering angle θs2 at a time point when the restriction determination unit 104 determines that the state in which the operation speed Vs2 during the output of the second operation command Cb is equal to or less than the determination threshold Ha is continued for the determination time Ta. In other words, the stop angle θp2 is the steering angle θs2 at the time point when the steering device 58 substantially stops. The restriction command unit 105 changes the second target angle θr2 to the stop angle θp2. When the second target angle θr2 is changed to the stop angle θp2 at the time point when the steering device 58 substantially stops, the second operation command unit 102 stops the output of the second operation command Cb for further operating the steering device 58 in the second steering direction from the stop angle θp2. Stopping the output of the second operation command Cb from the second operation command unit 102 stops the operation of the steering device 58 in the second steering direction.

The restriction command unit 105 maintains a state in which the steering device 58 is placed at the second target angle θr2 until the stationary time Tb elapses after the determination time Ta has elapsed.

After the operation of the steering device 58 in the second steering direction is stopped and the stationary time Tb has elapsed, the first operation command unit 101 outputs the first operation command Ca so that the steering device 58 operates in the target state.

Hereinafter, the process described above is repeated a specified number of times, whereby the stationary steering operation in which the steering device 58 operates in each of the first steering direction and the second steering direction is performed in the stopped state of the work vehicle 2. After the stationary steering operation is finished, the undercarriage 51 starts traveling on the basis of the travel data.

[Travel Control]

The travel data acquisition unit 106 acquires the travel data transmitted from the management device 21. The travel control unit 107 controls the undercarriage 51 on the basis of the travel data acquired by the travel data acquisition unit 106.

As described above, the travel data is defined by the travel points 11 and the travel path 12. The travel control unit 107 controls the undercarriage 51 so that the work vehicle 2 travels along the travel path 12. The travel control unit 107 controls the undercarriage 51 so that the work vehicle 2 travels, for example, in a state where the center of the work vehicle 2 in a vehicle width direction coincides with the travel path 12.

The travel control unit 107 controls the undercarriage 51 on the basis of each of detection data from the position sensor 71, detection data from the orientation sensor 72, detection data from the tilt sensor 73, detection data from the speed sensor 74, and the detection data from the steering sensor 75. The travel control unit 107 controls the undercarriage 51 so as to reduce a deviation between a detected position of the work vehicle 2 passing through a travel point 11, detected by the position sensor 71, and the target position of the work vehicle 2 set at the travel point 11. The travel control unit 107 controls the undercarriage 51 so as to reduce a deviation between a detected orientation of the work vehicle 2 passing through a travel point 11, detected by the orientation sensor 72, and the target orientation of the work vehicle 2 set at the travel point 11. The travel control unit 107 corrects the detected position of the work vehicle 2 on the basis of the attitude of the work vehicle 2 detected by the tilt sensor 73, upon passing through each travel point 11. The travel control unit 107 controls the undercarriage 51 so as to reduce a deviation between a detected travel speed of the work vehicle 2 passing through a travel point 11, detected by the speed sensor 74, and the target traveling speed of the work vehicle 2 set at the travel point 11. The travel control unit 107 controls the undercarriage 51 so as to reduce a deviation between a detected steering angle of the work vehicle 2 passing through a travel point 11, detected by the steering sensor 75, and a target steering angle of the work vehicle 2 set at the travel point 11.

[Warming Process and Warm-Up Process]

When the work site 1 is in a cold area, the temperature of hydraulic oil operating the hydraulic system 60 decreases. When the viscosity of the hydraulic oil increases as the temperature decreases, the responsiveness of the hydraulic system 60 may decrease. For example, when the viscosity of the hydraulic oil increases as the temperature decreases, there is a possibility that the steering response of the steering device 58 may decrease. When the steering response of the steering device 58 decreases, the following performance of the work vehicle 2 traveling along the travel path 12 may decrease.

In the embodiment, when the temperature of the hydraulic oil decreases, the warming process is performed to warm the hydraulic oil stored in the hydraulic oil tank 65. After the warming process for the hydraulic oil is performed, the warm-up process is performed to supply the warmed hydraulic oil in the hydraulic oil tank 65 to the steering device 58 to warm up the steering device 58. In the embodiment, each of the warming process and the warm-up process is performed in the stopped state of the work vehicle 2. When the warming process and the warm-up process are performed, the travel control unit 107 brings the work vehicle 2 into the stopped state.

The hydraulic oil temperature monitoring unit 108 monitors the temperature of the hydraulic oil in the hydraulic system 60. In the embodiment, the temperature of the hydraulic oil monitored by the hydraulic oil temperature monitoring unit 108 includes at least one of the temperature of the hydraulic oil stored in the hydraulic oil tank 65 and the temperature of the hydraulic oil in the steering device 58. The hydraulic oil temperature monitoring unit 108 acquires detection data from the temperature sensor 77 and detection data from the temperature sensor 78. The temperature sensor 77 detects a temperature of the hydraulic oil stored in the hydraulic oil tank 65. The temperature sensor 78 detects a temperature of hydraulic oil in the steering device 58. The hydraulic oil temperature monitoring unit 108 acquires the detection data from the temperature sensor 77 to monitor the temperature of the hydraulic oil stored in the hydraulic oil tank 65. The hydraulic oil temperature monitoring unit 108 acquires detection data from the temperature sensor 78 to monitor the temperature of the hydraulic oil in the steering device 58.

The warm-up determination unit 109 determines whether to perform the warming process for the hydraulic oil stored in the hydraulic oil tank 65 and the warm-up process for the steering device 58, on the basis of the temperature of the hydraulic oil in the hydraulic system 60 monitored by the hydraulic oil temperature monitoring unit 108. In other words, the warm-up determination unit 109 determines whether to perform the warming process and the warm-up process, on the basis of the detection data from the temperature sensor 77 and the detection data from the temperature sensor 78. In the embodiment, the warm-up determination unit 109 determines to perform the warming process and the warm-up process, when determining that both of a condition that the temperature of the hydraulic oil stored in the hydraulic oil tank 65 is less than a first temperature threshold Hb and a condition that the temperature of the hydraulic oil in the steering device 58 is less than a second temperature threshold Hc are satisfied. The warm-up determination unit 109 determines not to perform the warming process or the warm-up process, when determining that at least one of the condition that the temperature of the hydraulic oil stored in the hydraulic oil tank 65 is less than the first temperature threshold Hb and the condition that the temperature of the hydraulic oil in the steering device 58 is less than the second temperature threshold Hc is not satisfied. In one example, the first temperature threshold Hb is 30 [° C.], and the second temperature threshold Hc is 0 [° C.].

The warming command unit 110 outputs the warming command to warm the hydraulic oil stored in the hydraulic oil tank 65. The warming command unit 110 outputs the warming command on the basis of the determination by the warm-up determination unit 109. When the warm-up determination unit 109 determines to perform the warming process and the warm-up process, the warming command unit 110 outputs the warming command. When the warm-up determination unit 109 determines not to perform the warming process or the warm-up process, the warming command unit 110 does not output the warming command.

Figure 10:
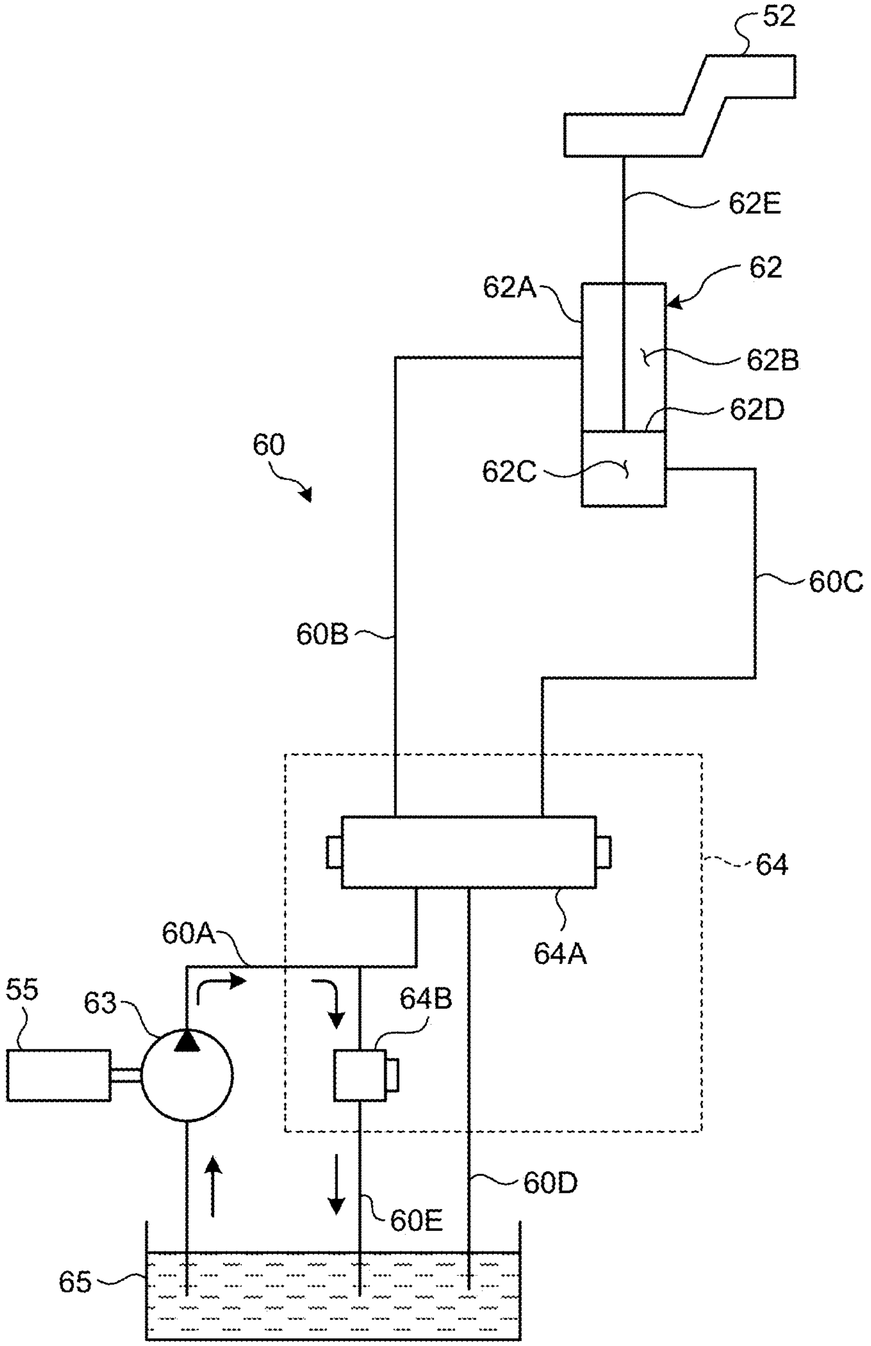
FIG. 10 is a diagram illustrating an exemplary warming process for hydraulic oil according to an embodiment.

FIG. 10 is a diagram illustrating an exemplary warming process for the hydraulic oil according to an embodiment.

As illustrated in FIG. 10, the valve device 64 includes a control valve 64A and a relief valve 64B. The control valve 64A controls a flow rate and direction of the hydraulic oil supplied to the hoist cylinder 62. The relief valve 64B is opened when pressure acting on the relief valve 64B exceeds a pressure threshold.

The hoist cylinder 62 includes a cylinder tube 62A that has a bottom, a piston 62D that partitions an internal space of the cylinder tube 62A into a head chamber 62B and a bottom chamber 62C, and a piston rod 62E that is connected to the piston 62D.

The outlet of the hydraulic pump 63 and the control valve 64A are connected via a flow path 60A. The control valve 64A and the head chamber 62B are connected via a flow path 60B. The control valve 64A and the bottom chamber 62C are connected via a flow path 60C. The control valve 64A and the hydraulic oil tank 65 are connected via a flow path 60D. The flow path 60A and the hydraulic oil tank 65 are connected via a flow path 60E. The relief valve 64B is placed in the flow path 60E.

The hydraulic pump 63 sucks the hydraulic oil stored in the hydraulic oil tank 65 and dispenses the hydraulic oil into the flow path 60A.

When the hoist cylinder 62 is retracted, the control valve 64A operates so that the hydraulic oil dispensed from the hydraulic pump 63 into the flow path 60A is supplied to the head chamber 62B via the flow path 60B. The hydraulic oil flowing out of the bottom chamber 62C due to the retraction of the hoist cylinder 62 is discharged into the hydraulic oil tank 65 via the flow path 60C, the control valve 64A, and the flow path 60D. When the hoist cylinder 62 retracts, the dump body 52 performs the lowering operation.

When the hoist cylinder 62 is extended, the control valve 64A operates so that the hydraulic oil dispensed from the hydraulic pump 63 into the flow path 60A is supplied to the bottom chamber 62C via the flow path 60C. The hydraulic oil flowing out of the head chamber 62B due to the extension of the hoist cylinder 62 is discharged into the hydraulic oil tank 65 via the flow path 60B, the control valve 64A, and the flow path 60D. The extension of the hoist cylinder 62 causes the dumping operation of the dump body 52.

In the warming process for the hydraulic oil stored in the hydraulic oil tank 65, the warming command unit 110 continues to operate the hydraulic pump 63 in the loading attitude of the dump body 52 while the work vehicle 2 is in the stopped state. The loading attitude of the dump body 52 includes a state in which the piston 62D is moved to an end portion (stroke end) on the bottom side of the cylinder tube 62A. When the hydraulic pump 63 continues to operate in the loading attitude of the dump body 52, the pressure in the head chamber 62B rises. When the pressure in the head chamber 62B rises and the pressure acting on the relief valve 64B exceeds the pressure threshold, the relief valve 64B is opened. Therefore, the hydraulic oil dispensed from the hydraulic pump 63 and flowing through the flow path 60A is returned to the hydraulic oil tank 65 via the relief valve 64B and the flow path 60E. In other words, when the hydraulic pump 63 continues to operate in the loading attitude of the dump body 52, the hydraulic oil dispensed from the hydraulic pump 63 circulates in a part of a circulation path of the hydraulic system 60, including the flow path 60A, the relief valve 64B, the flow path 60E, and the hydraulic oil tank 65. The circulation of the hydraulic oil through a part of the hydraulic system 60 raises the temperature of the hydraulic oil due to friction between the hydraulic oil and the flow path of the hydraulic system 60. Therefore, the hydraulic oil stored in the hydraulic oil tank 65 is warmed.

Figure 11:
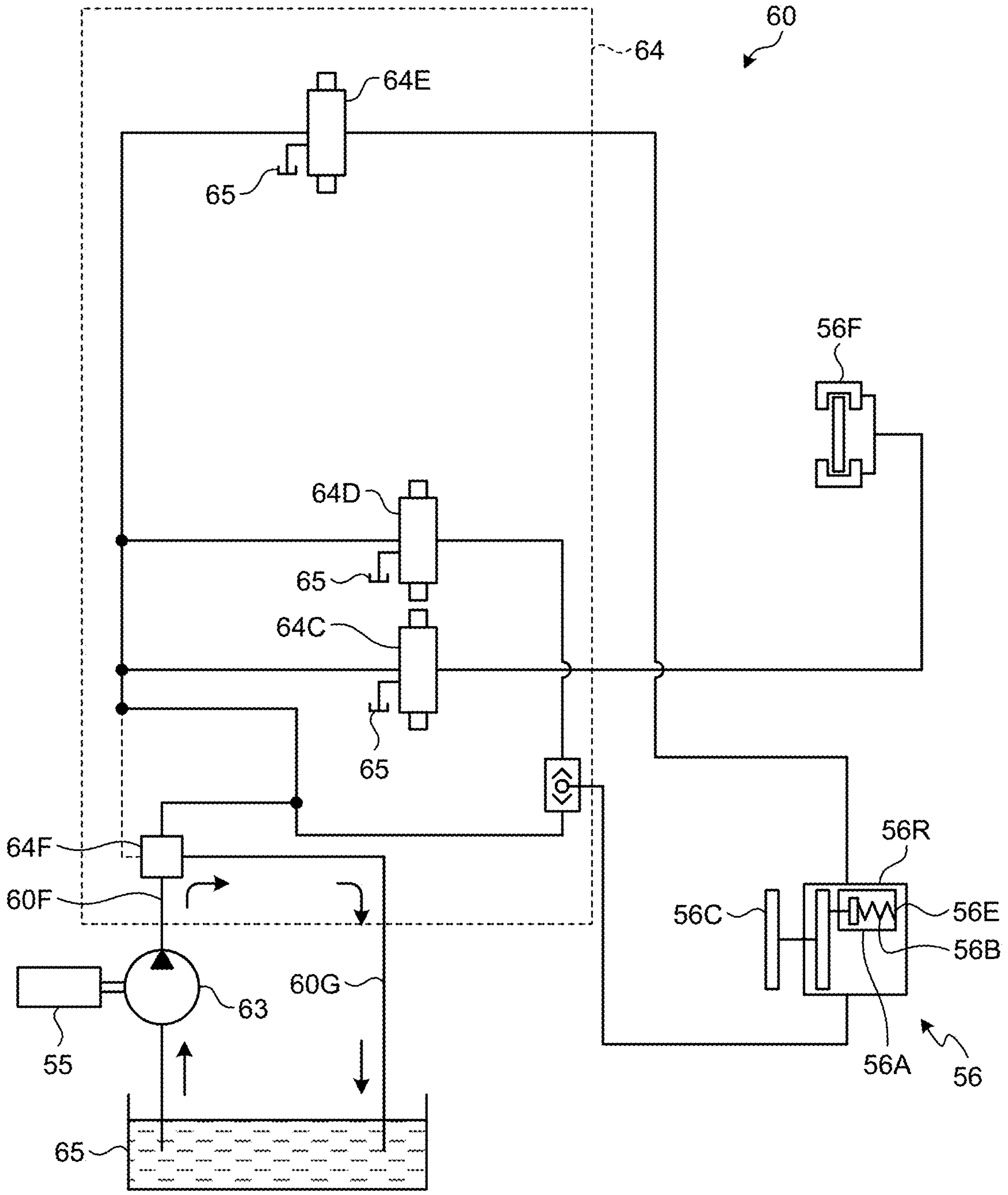
FIG. 11 is a diagram illustrating an exemplary warming process for hydraulic oil according to an embodiment.

FIG. 11 is a diagram illustrating an exemplary warming process for the hydraulic oil according to an embodiment.

As illustrated in FIG. 11, the brake devices 56 include the front brakes 56F, the rear brakes 56R, and an emergency brake 56E. The valve device 64 includes a front brake valve 64C, a rear brake valve 64D, an emergency brake valve 64E, and an unloading valve 64F. The front brake valve 64C controls a flow rate of hydraulic oil supplied to the front brake 56F. The rear brake valve 64D controls a flow rate of hydraulic oil supplied to the rear brake 56R. The emergency brake valve 64E controls a flow rate of hydraulic oil supplied to the emergency brake 56E.

The outlet of the hydraulic pump 63 is connected to the unloading valve 64F via a flow path 60F. The unloading valve 64F is connected to the hydraulic oil tank 65 via a flow path 60G. The unloading valve 64F operates to return the hydraulic oil dispensed from the hydraulic pump 63 to the hydraulic oil tank 65 when the pressure acting on the unloading valve 64F exceeds the pressure threshold.

At least part of the hydraulic oil dispensed from the hydraulic pump 63 is supplied to the front brake 56F via the front brake valve 64C. The front brake 56F is operated by the hydraulic oil supplied from the front brake valve 64C to stop the rotation of the front wheel 53F. At least part of the hydraulic oil dispensed from the hydraulic pump 63 is supplied to the rear brake 56R via the rear brake valve 64D. The rear brake 56R is operated by the hydraulic oil supplied from the rear brake valve 64D to stop the rotation of the rear wheel 53R.

The emergency brake 56E is provided in the rear brake 56R. The emergency brake 56E includes a cylinder 56A, a spring 56B, and a disk 56C. The spring 56B is placed in a cylinder chamber that is an internal space of the cylinder 56A. The spring 56B applies a resilient force to the disk 56C. When the disk 56C receives the resilient force from the spring 56B, the emergency brake 56E is operated. When the disk 56C is released from the resilient force of the spring 56B, the operation of the emergency brake 56E is stopped.

When at least art of the hydraulic oil dispensed from the hydraulic pump 63 is supplied to the cylinder chamber of the cylinder 56A via the emergency brake valve 64E, the pressure in the cylinder chamber increases. As the pressure in the cylinder chamber increases, the spring 56B is resiliently deformed to be separated from the disk 56C. Therefore, the disk 56C is released from the resilient force of the spring 56B, and the operation of the emergency brake 56E is stopped. When the supply of the hydraulic oil to the cylinder chamber is stopped by the emergency brake valve 64E, the pressure in the cylinder chamber decreases. As the pressure in the cylinder chamber decreases, the spring 56B resiliently deforms to apply the resilient force to the disk 56C. Therefore, the disk 56C receives the resilient force from the spring 56B, and the emergency brake 56E is operated.

In the warming process for the hydraulic oil stored in the hydraulic oil tank 65, the warming command unit 110 continues to operate the hydraulic pump 63 while the front brake valve 64C is operated so as not to supply the hydraulic oil to the front brake 56F, in the stopped state of the work vehicle 2. When the hydraulic pump 63 continues to operate while the hydraulic oil is not supplied to the front brake 56F, the pressure in a flow path between the hydraulic pump 63 and the front brake valve 64C rises. When the pressure in the flow path between the hydraulic pump 63 and the front brake valve 64C rises and the pressure acting on the unloading valve 64F exceeds the pressure threshold, the unloading valve 64F is opened. Therefore, the hydraulic oil dispensed from the hydraulic pump 63 and flowing through the flow path 60F is returned to the hydraulic oil tank 65 via the unloading valve 64F and the flow path 60G. In other words, when the hydraulic pump 63 continues to operate while the hydraulic oil is not supplied to the front brake 56F, the hydraulic oil dispensed from the hydraulic pump 63 circulates in a part of the circulation path of the hydraulic system 60, including the flow path 60F, the unloading valve 64F, the flow path 60G, and the hydraulic oil tank 65. The circulation of the hydraulic oil through a part of the hydraulic system 60 raises the temperature of the hydraulic oil due to friction between the hydraulic oil and the flow path of the hydraulic system 60. Therefore, the hydraulic oil stored in the hydraulic oil tank 65 is warmed.

In addition, the warming command unit 110 may continue to operate the hydraulic pump 63 while the rear brake valve 64D is operated so as not to supply the hydraulic oil to the rear brake 56R, in the stopped state of the work vehicle 2. When the hydraulic pump 63 continues to operate while the hydraulic oil is not supplied to the rear brake 56R, the pressure in a flow path between the hydraulic pump 63 and the rear brake valve 64D rises, and the unloading valve 64F is opened. Therefore, the hydraulic oil dispensed from the hydraulic pump 63 circulates in a part of the circulation path of the hydraulic system 60, including the flow path 60F, the unloading valve 64F, the flow path 60G, and the hydraulic oil tank 65.

In addition, the warming command unit 110 may continue to operate the hydraulic pump 63 while the emergency brake valve 64E is operated so as not to supply the hydraulic oil to the emergency brake 56E, in the stopped state of the work vehicle 2. When the hydraulic pump 63 continues to operate while the hydraulic oil is not supplied to the emergency brake 56E, the pressure in a flow path between the hydraulic pump 63 and the emergency brake valve 64E rises, and the unloading valve 64F is opened. Therefore, the hydraulic oil dispensed from the hydraulic pump 63 circulates in a part of the circulation path of the hydraulic system 60, including the flow path 60F, the unloading valve 64F, the flow path 60G, and the hydraulic oil tank 65.

The warm-up command unit 111 outputs the warm-up command to perform the warm-up process for the steering device 58. The warm-up command unit 111 outputs the warm-up command on the basis of the determination by the warm-up determination unit 109. When the warm-up determination unit 109 determines to perform the warming process and the warm-up process, the warm-up command unit 111 outputs the warm-up command. When the warm-up determination unit 109 determines not to perform the warming process or the warm-up process, the warm-up command unit 111 does not output the warm-up command.

The warm-up process for the steering device 58 includes supplying the hydraulic oil in the hydraulic oil tank 65 warmed in the warming process to the steering device 58. In the embodiment, the warm-up process for the steering device 58 includes the stationary steering operation of the steering device 58. The warm-up command output from the warm-up command unit 111 includes an output command for causing the first operation command unit 101 to output the first operation command Ca. Furthermore, the warm-up command output from the warm-up command unit 111 includes an output command for causing the second operation command unit 102 to output the second operation command Cb. The warm-up command unit 111 causes the first operation command unit 101 to output the first operation command Ca on the basis of the determination by the warm-up determination unit 109. The warm-up command unit 111 causes the second operation command unit 102 to output the second operation command Cb on the basis of the determination by the warm-up determination unit 109. When the first operation command Ca and the second operation command Cb are output to operate the steering cylinder 61, in the stopped state of the work vehicle 2, the warmed hydraulic oil in the hydraulic oil tank 65 is supplied from the hydraulic pump 63 to the steering cylinder 61. Thus, the steering device 58 is subjected to the warm-up process.

After the warm-up process for the steering device 58, traveling of the work vehicle 2 is started. Supplying the warmed hydraulic oil to the steering cylinder 61 suppresses a decrease in steering response of the steering device 58.

In some cases, the work vehicle 2 in the loaded state stops in the dumping place 5 or at a standby point at the entrance of the dumping place 5 to stand by for the dumping work. When the work site 1 is in the cold area, the temperature of the hydraulic oil is lowered while the work vehicle 2 is stopped. Therefore, in some cases, the warm-up process for the steering device 58 may be required at the standby point. In other words, the work vehicle 2 in the loaded state may need to cause the steering device 58 to perform the stationary steering operation. According to the embodiment, the operation of the steering device 58 is stopped before an excessively high load is applied to the steering device 58 on the basis of the state of the steering device 58. This configuration makes it possible for the work vehicle 2 to perform the warm-up process on the steering device 58 while suppressing deterioration of the steering device 58. The work vehicle 2 is allowed to travel from the standby point to an unloading point along the travel path 12 with high following performance.

[Control Method]

Figure 12:
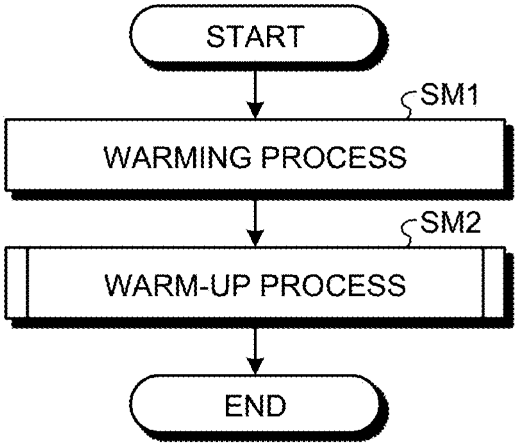
FIG. 12 is a flowchart illustrating a control method for the work vehicle according to an embodiment.

FIG. 12 is a flowchart illustrating a control method for the work vehicle 2 according to an embodiment.

As illustrated in FIG. 12, the control method for the work vehicle 2 includes the warming process for the hydraulic oil stored in the hydraulic oil tank 65 (Step SM1), and the warm-up process for the steering device 58 (Step SM2). Each of the warming process and the warm-up process is performed in the stopped state of the work vehicle 2.

As described above, the warm-up determination unit 109 determines whether to perform the warming process and the warm-up process, on the basis of the temperature of the hydraulic oil monitored by the hydraulic oil temperature monitoring unit 108. When the warm-up determination unit 109 determines to perform the warming process and the warm-up process, the warm-up process (Step SM2) is performed after the warming process (Step SM1) is performed.

As described with reference to FIGS. 10 and 11, the warming command unit 110 is configured to circulate the hydraulic oil in at least a part of the hydraulic system 60 to warm the hydraulic oil stored in the hydraulic oil tank 65.

After the warming process for the hydraulic oil stored in the hydraulic oil tank 65, the warm-up process is performed on the steering device 58. As described above, the warm-up process includes supplying the hydraulic oil in the hydraulic oil tank 65 warmed in the warming process to the steering device 58. The warm-up process for the steering device 58 includes causing the steering device 58 to perform the stationary steering operation. The warm-up command unit 111 outputs the warm-up command to cause the steering device 58 to perform the stationary steering operation. When the warm-up command is output from the warm-up command unit 111, the stationary steering operation for the warm-up process for the steering device 58 is started.

Figure 13:
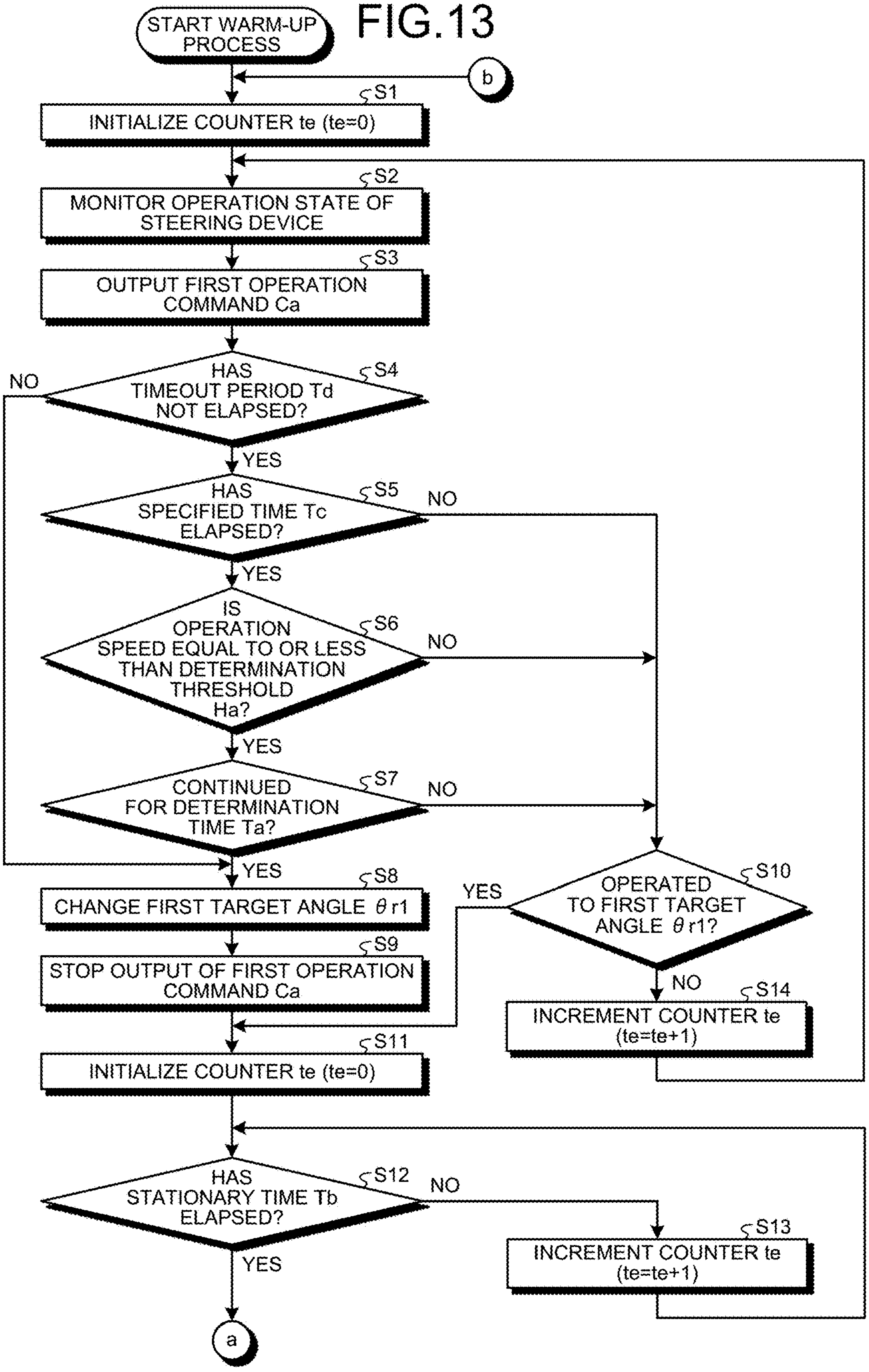
FIG. 13 is a flowchart illustrating a warm-up process for the steering device according to an embodiment.
Figure 14:
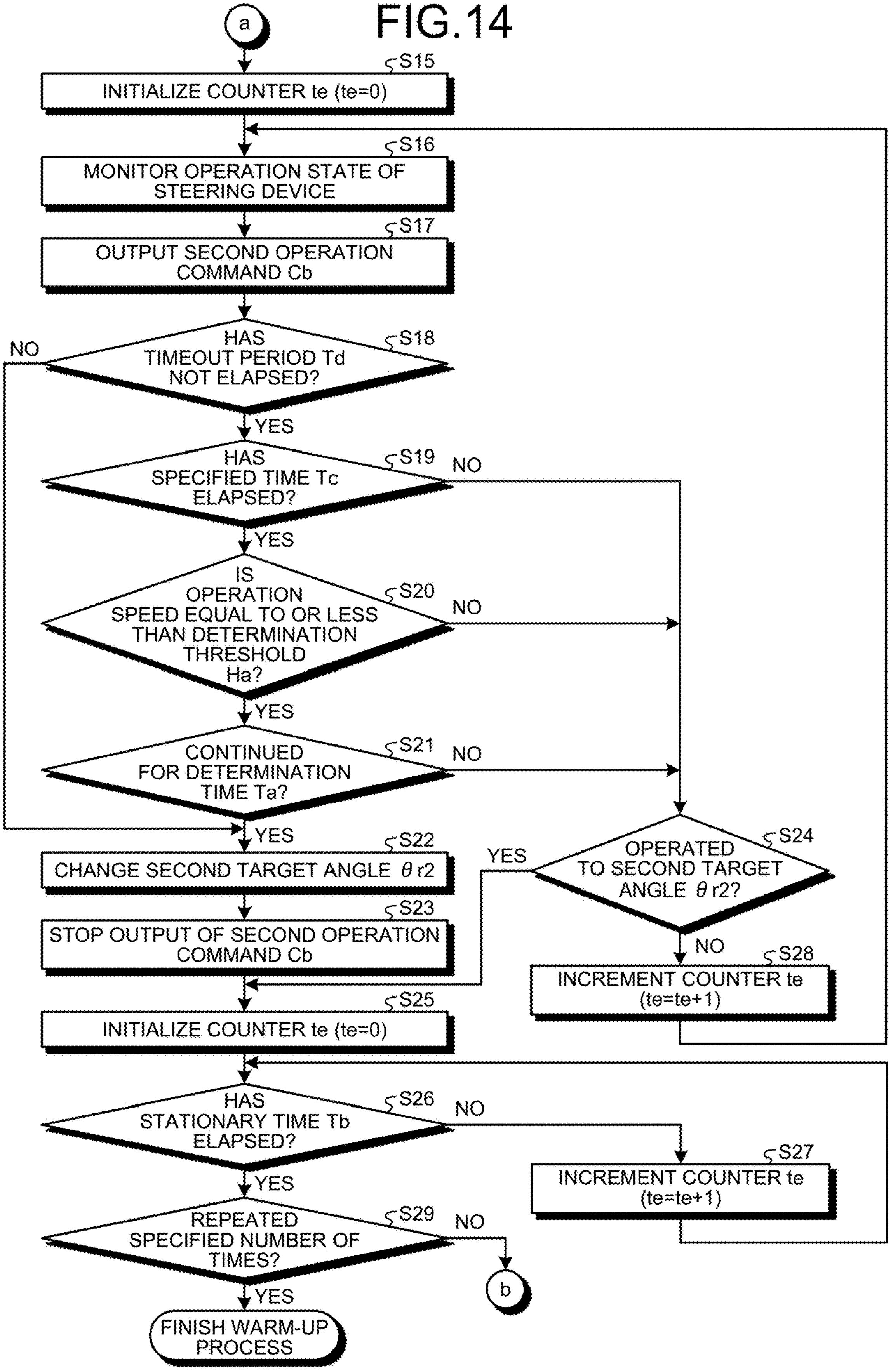
FIG. 14 is a flowchart illustrating the warm-up process for the steering device according to the embodiment.

Each of FIGS. 13 and 14 is a flowchart illustrating the warm-up process for the steering device 58 according to an embodiment.

When the warm-up command is output from the warm-up command unit 111 and the warm-up process for the steering device 58 is started, the counter unit 112 initializes the counter te (Step S1).

The state monitoring unit 103 starts monitoring the operation state of the steering device 58 (Step S2).

The first operation command unit 101 outputs the first operation command Ca to operate the steering device 58 in the first steering direction on the basis of the warm-up command output from the warm-up command unit 111 (Step S3).

The first operation command unit 101 determines, on the basis of the counter te, whether a timeout period Td is yet to elapse from a time point when the first operation command Ca is output (Step S4).

The timeout period Td has a predetermined value. The timeout period Td is, for example, 20 [sec.].

In Step S4, when it is determined that the timeout period Td is yet to elapse (Step S4: Yes), the restriction determination unit 104 determines, on the basis of the counter te, whether a specified time Tc has elapsed from starting the output of the first operation command Ca (Step S5).

The specified time Tc has a predetermined value. The specified time Tc is, for example, 1 [sec.].

When it is determined that the specified time Tc has elapsed in Step S5, (Step S5: Yes), the restriction determination unit 104 determines whether the operation speed of the steering device 58 is equal to or less than the determination threshold Ha, on the basis of the detection data from the steering sensor 75, monitored by the state monitoring unit 103 (Step S6).

When it is determined that the operation speed of the steering device 58 is equal to or less than the determination threshold Ha in Step S6 (Step S6: Yes), the restriction determination unit 104 determines, on the basis of the counter te, whether the state where the operation speed of the steering device 58 is equal to or less than the determination threshold Ha is continued for the determination time Ta from a time point at which the operation speed of the steering device 58 is determined to be equal to or less than the determination threshold Ha (Step S7).

When it is determined that the state where the operation speed of the steering device 58 is equal to or less than the determination threshold Ha is continued for the determination time Ta in Step S7 (Step S7: Yes), and when it is determined that the timeout period Td has elapsed in Step S4 (Step S4: No), the restriction command unit 105 changes the first target angle θr1. The state monitoring unit 103 monitors the stop angle θp1 that indicates the steering angle of the steering device 58 when the steering device 58 operated in the first steering direction on the basis of the first operation command Ca substantially stops. The stop angle θp1 is a steering angle of the steering device 58 at a time point after the determination time Ta from the time point when the operation speed of the steering device 58 is determined to be equal to or less than the determination threshold Ha. The restriction command unit 105 changes the first target angle θr1 to the stop angle θp1 (Step S8).

When the first target angle θr1 is changed to the stop angle θp1, the first operation command unit 101 stops the output of the first operation command Ca (Step S9).

When it is determined that the specified time Tc has not elapsed in Step S5 (Step S5: No), when it is determined that the operation speed of the steering device 58 is not equal to or less than the determination threshold Ha in Step S6 (Step S6: No), and when it is determined that the state where the operation speed of the steering device 58 is equal to or less than the determination threshold Ha is not continued for the determination time Ta in Step S7 (Step S7: No), the restriction determination unit 104 determines whether the steering device 58 has operated to the first target angle θr1, on the basis of the detection data from the steering sensor 75, monitored by the state monitoring unit 103 (Step S10).

When the output of the first operation command Ca is stopped in Step S9 and when it is determined that the steering device 58 has operated to the first target angle θr1 in Step S10 (Step S10: Yes), the counter unit 112 initializes the counter te (Step S11).

The restriction determination unit 104 determines, on the basis of the counter te, whether the stationary time Tb has elapsed from a time point at which the output of the first operation command Ca is stopped (Step S12).

When it is determined that the stationary time Tb has not elapsed in Step S12 (Step S12: No), the counter unit 112 increments the counter te (Step S13).

After the counter te is incremented, the process returns to Step S12.

When it is determined that the steering device 58 has not operated to the first target angle θr1 in Step S10 (Step S10: No), the counter unit 112 increments the counter te (Step S14).

After the counter te is incremented, the process returns to Step S2.

When it is determined that the stationary time Tb has elapsed in Step S12 (Step S12: Yes), the counter unit 112 initializes the counter te (Step S15).

The state monitoring unit 103 starts monitoring the operation state of the steering device 58 (Step S16).

The second operation command unit 102 outputs the second operation command Cb to operate the steering device 58 in the second steering direction (Step S17).

The second operation command unit 102 determines, on the basis of the counter te, whether the timeout period Td is yet to elapse from a time point when the second operation command Cb is output (Step S18).

When it is determined that the timeout period Td is yet to elapse in Step S18 (Step S18: Yes), the restriction determination unit 104 determines, on the basis of the counter te, whether the specified time Tc has elapsed from starting the output of the second operation command Cb (Step S19).

When it is determined that the specified time Tc has elapsed in Step S19, (Step S19: Yes), the restriction determination unit 104 determines whether the operation speed of the steering device 58 is equal to or less than the determination threshold Ha, on the basis of the detection data from the steering sensor 75, monitored by the state monitoring unit 103 (Step S20).

When it is determined that the operation speed of the steering device 58 is equal to or less than the determination threshold Ha in Step S20 (Step S20: Yes), the restriction determination unit 104 determines, on the basis of the counter te, whether the state where the operation speed of the steering device 58 is equal to or less than the determination threshold Ha is continued for the determination time Ta from a time point at which the operation speed of the steering device 58 is determined to be equal to or less than the determination threshold Ha (Step S21).

When it is determined that the state where the operation speed of the steering device 58 is equal to or less than the determination threshold Ha is continued for the determination time Ta in Step S21 (Step S21: Yes), and when it is determined that the timeout period Td has elapsed in Step S18 (Step S18: No), the restriction command unit 105 changes the second target angle θr2. The state monitoring unit 103 monitors the stop angle θp2 that indicates the steering angle of the steering device 58 when the steering device 58 operated in the second steering direction on the basis of the second operation command Cb substantially stops. The stop angle θp2 is a steering angle of the steering device 58 at a time point after the determination time Ta from the time point when the operation speed of the steering device 58 is determined to be equal to or less than the determination threshold Ha. The restriction command unit 105 changes the second target angle θr2 to the stop angle θp2 (Step S22).

When the second target angle θr2 is changed to the stop angle θp2, the second operation command unit 102 stops the output of the second operation command Cb (Step S23).

When it is determined that the specified time Tc has not elapsed in Step S19 (Step S19: No), when it is determined that the operation speed of the steering device 58 is not equal to or less than the determination threshold Ha in Step S20 (Step S20: No), and when it is determined that the state where the operation speed of the steering device 58 is equal to or less than the determination threshold Ha is not continued for the determination time Ta in Step S21 (Step S21: No), the restriction determination unit 104 determines whether the steering device 58 has operated to the second target angle θr2, on the basis of the detection data from the steering sensor 75, monitored by the state monitoring unit 103 (Step S24).

When the output of the second operation command Cb is stopped in Step S23 and when it is determined that the steering device 58 has operated to the second target angle θr2 in Step S24 (Step S24: Yes), the counter unit 112 initializes the counter te (Step S25).

The restriction determination unit 104 determines, on the basis of the counter te, whether the stationary time Tb has elapsed from a time point at which the output of the second operation command Cb is stopped (Step S26).

When it is determined that the stationary time Tb has not elapsed in Step S26 (Step S26: No), the counter unit 112 increments the counter te (Step S27).

After the counter te is incremented, the process returns to Step S26.

When it is determined that the steering device 58 has not operated to the second target angle θr2 in Step S24 (Step S24: No), the counter unit 112 increments the counter te (Step S28).

After the counter te is incremented, the process returns to Step S16.

When it is determined that the stationary time Tb has elapsed in Step S26 (Step S26: Yes), the warm-up command unit 111 determines whether operation of the steering device 58 in the first steering direction and in the second steering has been repeated a specified number of times in the stopped state of the work vehicle 2 (Step S29).

The specified number of times has a predetermined value. In one example, the specified number of times is five.

In Step S29, when it is determined that the operation has not been repeated the specified number of times (Step S29: No), the process returns to Step S1.

In Step S29, when it is determined that the operation has been repeated the specified number of times (Step S29: Yes), the warm-up process for the steering device 58 is finished.

[Effects]

As described above, according to the embodiments, the first operation command Ca to operate the steering device 58 of the work vehicle 2 in the first steering direction in the stopped state of the work vehicle 2 is output. The state of the steering device 58 during the output of the first operation command Ca is monitored. It is determined whether to restrict the operation of the steering device 58 in the first steering direction, on the basis of the state of the steering device 58 during the output of the first operation command Ca. For example, when it is determined that a high load is applied to the steering device 58, on the basis of the operation state of the steering device 58, the operation of the steering device 58 in the first steering direction is stopped. This configuration prevents the steering device 58 from forcibly operating. Therefore, application of an excessively high load to at least a part of the steering device 58 is suppressed. For example, application of the excessively high load to the link mechanism 58L is suppressed. Therefore, deterioration of the steering device 58 is suppressed. In addition, deterioration of the front tire 54F is also suppressed.

The first operation command Ca is output so that the steering device 58 operates in the target state. On the basis of a difference between the target state and the operation state, whether to restrict the operation of the steering device in the first steering direction is appropriately determined.

The state of the steering device 58 includes the operation speed of the steering device 58. On the basis of the operation speed of the steering device 58, it is appropriately determined whether the high load is applied to the steering device 58.

When the state in which the operation speed of the steering device 58 during the output of the first operation command Ca is equal to or less than the determination threshold Ha continues for the determination time Ta, the operation of the steering device 58 in the first steering direction is restricted. If determination criteria for restricting the operation of the steering device 58 are not appropriately set, the stationary steering operation may not be appropriately performed. According to the embodiments, the determination criteria for restricting the operation of the steering device 58 are appropriately set, and therefore, the stationary steering operation is appropriately performed.

As illustrated in Step S4 of FIG. 13, it is determined whether the specified time Tc has elapsed after the first operation command Ca is output. After the specified time Tc has elapsed from the output of the first operation command Ca, it is determined whether to restrict the operation of the steering device 58 in the first steering direction. In other words, after the specified time Tc has elapsed, the restriction determination unit 104 determines that the operation speed is equal to or less than the determination threshold Ha (Step S5) and that the determination time Ta has elapsed (Step S6). There is a possibility that a time lag occurs in a period from the output of the first operation command Ca to the actual start of the operation of the steering device 58. When it is determined whether to restrict the operation of the steering device 58 without considering the time lag, the restriction determination unit 104 may erroneously determine that the steering device 58 may be inoperable although the steering device 58 is actually in an operable state. Setting the specified time Tc in consideration of the time lag makes it possible to suppress erroneous determination by the restriction determination unit 104.

As illustrated in FIG. 9 and Step S12 of FIG. 13, the second operation command Cb is output after the stationary time Tb has elapsed after the output of the first operation command Ca is stopped. Furthermore, as illustrated in FIG. 9 and Step S26 of FIG. 14, the first operation command Ca is output after the stationary time Tb has elapsed after the output of the second operation command Cb is stopped. Setting the stationary time Tb makes it possible to suppress an increase in the load applied to the steering device 58 in the stationary steering operation.

When the steering device 58 substantially stops before reaching the first target angle θr1, the first target angle θr1 is changed to the stop angle θp1 that is a steering angle when the steering device 58 substantially stops. Therefore, the output of the first operation command Ca for further operating the steering device 58 in the first steering direction from the stop angle θp1 is stopped. Stopping the output of the first operation command Ca stops the operation of the steering device 58 in the first steering direction is stopped. Note that when the first target angle θr1 is set to the maximum movable angle of the steering device 58, the first target angle θr1 may not be changed to the stop angle θp1 and may be changed to a value smaller than that of the maximum movable angle. The first target angle θr1 may be changed to, for example, a steering angle between the maximum movable angle and the stop angle θp1.

In the embodiments, the warming process for the hydraulic oil stored in the hydraulic oil tank 65 and the warm-up process for the steering device 58 are performed, on the basis of the temperature of the hydraulic oil in the hydraulic system 60. In an embodiment, the warm-up process for the steering device 58 includes the stationary steering operation of the steering device 58. As described above, in the work site 1 in the cold area, the work vehicle 2 in the loaded state may need to cause the steering device 58 to perform the stationary steering operation at the standby point. According to the embodiments, the operation of the steering device 58 is restricted, before an excessively high load is applied to the steering device 58, on the basis of the operation state of the steering device 58. This configuration makes it possible for the work vehicle 2 to perform the warm-up process on the steering device 58 while suppressing deterioration of the steering device 58. The work vehicle 2 is allowed to travel from the standby point to the unloading point along the travel path 12 with high following performance.

Other Embodiments

In the embodiments described above, a factor of a high load applied to the steering device 58 have been the loads on the dump body 52. In addition to the load on the dump body 52, an example of the factor of the high load applied to the steering device 58 includes falling of the front tire 54F into a ditch in the ground at the work site 1. When the front tire 54F falls into the ditch, it is difficult to steer the front tire 54F, and thus a high load may be applied to the steering device 58. Furthermore, an example of the factor of the high load applied to the steering device 58 includes the nature of the ground at the work site 1. For example, when the ground at the work site 1 is muddy or sandy, it is difficult to steer the front tire 54F, and thus the high load may be applied to the steering device 58.

In the embodiments described above, the stationary steering operation of the steering device 58 has been performed for the warm-up process for the steering device 58. A scene where the stationary steering operation of the steering device 58 is performed is not limited to the warm-up process. For example, when a part of the front tire 54F is buried in the ground due to the nature of the ground at the work site 1, the stationary steering operation of the steering device 58 is performed to remove the front tire 54F from the ground.

In the embodiments described above, the state of the steering device 58 has included the operation state of the steering device 58. In addition, the operation state of the steering device 58 includes the steering angle of the steering device 58 and the operation speed of the steering device 58. It may be determined whether to restrict the operation of the steering device 58 on the basis of the steering angle of the steering device 58. For example, when there is a difference between the actual steering angle at the end of the operation of the steering device 58 after the first operation command Ca is output and the target angle, the operation of the steering device 58 may be restricted.

The state of the steering device 58 may include the pressure of the hydraulic oil in the steering cylinder 61. The pressure of the hydraulic oil in the steering cylinder 61 changes depending on the operation state of the steering device 58. When the load applied to the steering device 58 is high, the pressure of the hydraulic oil increases. The state monitoring unit 103 acquires detection data from each of the pressure sensors 76. The pressure sensor 76 detects the pressure of hydraulic oil in the steering cylinder 61. The state monitoring unit 103 may acquire the detection data from the pressure sensor 76 to monitor the state of the steering device 58.

Furthermore, the state monitoring unit 103 may indirectly monitor the state of the steering device 58 on the basis of the tilt angle of the vehicle body 50. For example, when the vehicle body 50 is greatly inclined due to the nature of the ground at the work site 1, it is difficult to steer the front wheel 53F, and thus the high load may be applied to the steering device 58. The state monitoring unit 103 acquires the detection data from the tilt sensor 73. The tilt sensor 73 detects the tilt angle of the vehicle body 50. The state monitoring unit 103 may acquire the detection data from the tilt sensor 73 to indirectly monitor the state of the steering device 58.

In the embodiments described above, the first operation command Ca and the second operation command Cb have been alternately output in the stationary steering operation. In other words, the steering device 58 alternately operates in the first steering direction and the second steering direction. In the stationary steering operation, the first operation command Ca may be output and the second operation command Cb may not be output. In other words, the steering device 58 may not alternately operate in the first steering direction and the second steering direction. The steering device 58 may operate only once in one of the first steering direction and the second steering direction.

In the embodiments described above, at least some of the functions of the control device 30 may be provided in the management device 21. In other words, some or all of the first operation command unit 101, the second operation command unit 102, the state monitoring unit 103, the restriction determination unit 104, the restriction command unit 105, the travel data acquisition unit 106, the travel control unit 107, the hydraulic oil temperature monitoring unit 108, the warm-up determination unit 109, the warming command unit 110, the warm-up command unit 111, and the counter unit 112 may be provided in the management device 21. For example, when the first operation command unit 101 is provided in the management device 21, the first operation command Ca is transmitted to the control device 30 of the work vehicle 2 via the communication system 22. When the state monitoring unit 103 is provided in the management device 21, the detection data from the steering sensor 75 is transmitted to the management device 21 via the communication system 22, and the state monitoring unit 103 is allowed to monitor the state of the steering device 58. In addition, when the restriction determination unit 104 is provided in the management device 21, the restriction determination unit 104 is allowed to determine whether to restrict the operation of the steering device 58 in the first steering direction, on the basis of the detection data from the steering sensor 75 transmitted to the management device 21. The restriction command unit 105 is allowed to stop the output of the first operation command Ca, even when provided in the management device 21.

In the embodiments described above, at least some of the functions of the management device 21 may be provided in the control device 30.

In the embodiments described above, each of the first operation command unit 101, the second operation command unit 102, the state monitoring unit 103, the restriction determination unit 104, the restriction command unit 105, the travel data acquisition unit 106, the travel control unit 107, the hydraulic oil temperature monitoring unit 108, the warm-up determination unit 109, the warming command unit 110, the warm-up command unit 111, and the counter unit 112 may be configured by separate hardware.

In the embodiments described above, the work vehicle 2 has been the unmanned vehicle. The work vehicle 2 may be a manned vehicle. The manned vehicle represents a work vehicle that operates by a driving operation by a driver who is in a cab of the work vehicle 2.

Figure 15:
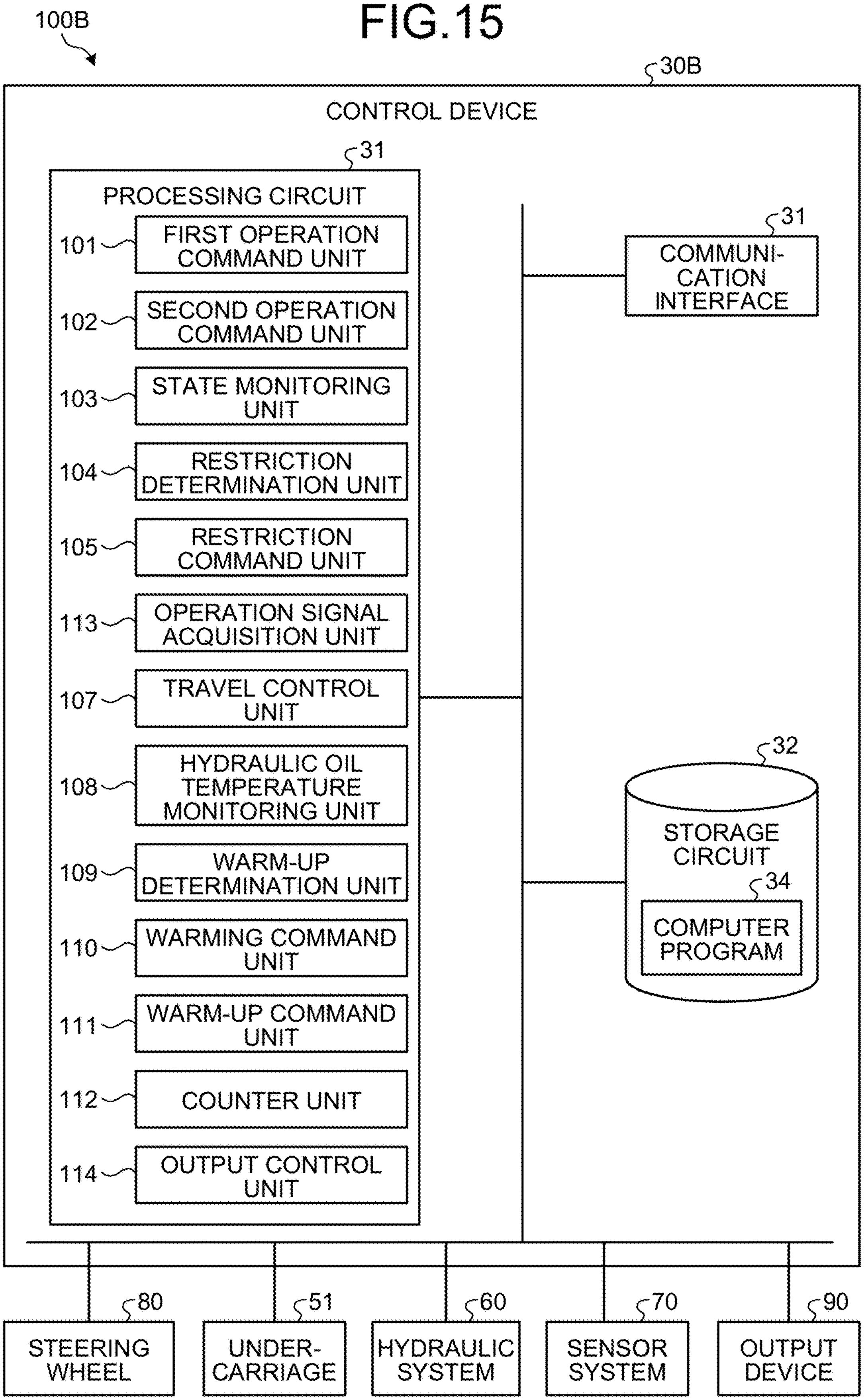
FIG. 15 is a functional block diagram illustrating a control system for a manned vehicle according to an embodiment.

FIG. 15 is a functional block diagram illustrating a control system 100B for the manned vehicle according to an embodiment.

The manned vehicle includes a steering wheel 80 and an output device 90. Each of the steering wheel 80 and the output device 90 is placed in a cab of the manned vehicle.

The steering wheel 80 is operated by the driver to operate the steering device 58. The steering wheel 80 generates an operation signal on the basis of an amount of operation of the steering wheel 80. When the steering wheel 80 is operated, the operation signal is transmitted from the steering wheel 80 to a control device 30B.

The output device 90 outputs output data related to the steering device 58. Examples of the output device 90 include a display device or a voice output device. Examples of the display device include a flat panel display such as a liquid crystal display (LCD) or an organic electroluminescence display (organic EL display: OELD). The display device outputs display data as the output data. The voice output device outputs voice data as the output data.

The control device 30B of the control system 100B includes an operation signal acquisition unit 113 instead of the travel data acquisition unit 106. Furthermore, the control device 30B includes an output control unit 114. The operation signal acquisition unit 113 acquires the operation signal transmitted from the steering wheel 80. The output control unit 114 controls the output device 90.

In order to perform the stationary steering operation of the steering device 58, the driver operates the steering wheel 80 in the stopped state of the manned vehicle. When the steering wheel 80 is operated so that the steering device 58 operates in the first steering direction, the first operation command unit 101 outputs the first operation command Ca to operate the steering device 58 in the first steering direction, on the basis of the operation signal acquired by the operation signal acquisition unit 113. When the first operation command Ca is output so that the steering device 58 operates in the first steering direction, the restriction command unit 105 stops the output of the first operation command Ca when the steering device 58 is stopped. Therefore, the operation of the steering device 58 in the first steering direction is stopped, and the application of the excessively high load to the steering device 58 is suppressed.

When the output of the first operation command Ca is stopped, the output control unit 114 causes the output device 90 to output the output data indicating that the output of the first operation command Ca is stopped. In addition, the output control unit 114 causes the output device 90 to output the output data indicating guidance related to the operation of the steering wheel 80. The guidance related to the operation of the steering wheel 80 includes guidance for operation of the steering wheel 80 so that the steering device 58 operates in the second steering direction. This configuration makes it possible for the driver to stop continuous operation of the steering wheel 80, that is, the operation of the steering device 58 in the first steering direction. The driver is allowed to operate the steering wheel 80 so that the steering device 58 operates in the second steering direction.

In the embodiments described above, the second operation command unit 102 has output the second operation command Cb to operate the steering device 58 in the second steering direction opposite to the first steering direction, after the operation of the steering device 58 in the first steering direction has stopped and the stationary time Tb has elapsed. The restriction command unit 105 may not set the stationary time Tb. The second operation command unit 102 may output the second operation command Cb to operate the steering device 58 in the second steering direction opposite to the first steering direction, immediately after the operation of the steering device 58 in the first steering direction is stopped.

In the embodiments described above, when a state in which the operation speed Vs1 during the output of the first operation command Ca is equal to or less than a determination threshold Ha continues for a determination time Ta, the restriction determination unit 104 determines that the steering device 58 is substantially stopped and determines to restrict the operation of the steering device 58 in the first steering direction. The restriction determination unit 104 may compare the target state of the steering device 58 during output of the first operation command Ca from the first operation command unit 101, with the state of the steering device 58 acquired from the state monitoring unit 103 during output of the first operation command Ca from the first operation command unit 101, and determine whether to restrict the operation of the steering device 58 in the first steering direction, on the basis of the difference between the target state of the steering device 58 and the state of the steering device 58. When there is substantially no difference between the target state of the steering device 58 and the state of the steering device 58 acquired by the state monitoring unit 103, the restriction determination unit 104 may determine not to restrict the operation of the steering device 58 in the first steering direction. When there is a difference between the target state of the steering device 58 and the state of the steering device 58 acquired by the state monitoring unit 103, the restriction determination unit 104 may determine to restrict the operation of the steering device 58 in the first steering direction.

In the embodiments described above, the work vehicle 2 may be a mechanically driven dump truck or an electrically driven dump truck.

In the embodiments described above, the work vehicle 2 has been the haulage vehicle. The work vehicle 2 may not be the haulage vehicle as long as the work vehicle includes the steered wheels and the steering device 58.

REFERENCE SIGNS LIST

1 WORK SITE
2 WORK VEHICLE
3 TRAVEL AREA
4 LOADING PLACE
5 DUMPING PLACE
6 TRAVEL COURSE
7 LOADER
8 CRUSHER
10 CONTROL FACILITY
11 TRAVEL POINT
12 TRAVEL PATH
20 MANAGEMENT SYSTEM
21 MANAGEMENT DEVICE
22 COMMUNICATION SYSTEM
22A WIRELESS COMMUNICATION DEVICE
22B WIRELESS COMMUNICATION DEVICE
30 CONTROL DEVICE
30B CONTROL DEVICE
31 COMMUNICATION INTERFACE
32 STORAGE CIRCUIT
33 PROCESSING CIRCUIT
34 COMPUTER PROGRAM
50 VEHICLE BODY
51 UNDERCARRIAGE
52 DUMP BODY
53 WHEEL
53F FRONT WHEEL
53R REAR WHEEL
54 TIRE
54F FRONT TIRE
54R REAR TIRE
55 DRIVING DEVICE
56 BRAKE DEVICE
56A CYLINDER
56B SPRING
56C DISK
56F FRONT BRAKE
56R REAR BRAKE
56E EMERGENCY BRAKE
57 TRANSMISSION DEVICE
58 STEERING DEVICE
58L LINK MECHANISM
59 TRANSFER MECHANISM
60 HYDRAULIC SYSTEM
60A FLOW PATH
60B FLOW PATH
60C FLOW PATH
60D FLOW PATH
60E FLOW PATH
60F FLOW PATH
60G FLOW PATH
61 STEERING CYLINDER
62 HOIST CYLINDER
62A CYLINDER TUBE
62B HEAD CHAMBER
62C BOTTOM CHAMBER
62D PISTON
62E PISTON ROD
63 HYDRAULIC PUMP
64 VALVE DEVICE
64A CONTROL VALVE
64B RELIEF VALVE
64C FRONT BRAKE VALVE
64D REAR BRAKE VALVE
64E EMERGENCY BRAKE VALVE
64F UNLOADING VALVE
65 HYDRAULIC OIL TANK
70 SENSOR SYSTEM
71 POSITION SENSOR
72 ORIENTATION SENSOR
73 TILT SENSOR
74 SPEED SENSOR
75 STEERING SENSOR
76 PRESSURE SENSOR
77 TEMPERATURE SENSOR
78 TEMPERATURE SENSOR
80 STEERING WHEEL
90 OUTPUT DEVICE
100 CONTROL SYSTEM
100B CONTROL SYSTEM
101 FIRST OPERATION COMMAND UNIT
102 SECOND OPERATION COMMAND UNIT
103 STATE MONITORING UNIT
104 RESTRICTION DETERMINATION UNIT
105 RESTRICTION COMMAND UNIT
106 TRAVEL DATA ACQUISITION UNIT
107 TRAVEL CONTROL UNIT
108 HYDRAULIC OIL TEMPERATURE MONITORING UNIT
109 WARM-UP DETERMINATION UNIT
110 WARMING COMMAND UNIT
111 WARM-UP COMMAND UNIT
112 COUNTER UNIT
113 OPERATION SIGNAL ACQUISITION UNIT
114 OUTPUT CONTROL UNIT
Ca FIRST OPERATION COMMAND
Cb SECOND OPERATION COMMAND
Ha DETERMINATION THRESHOLD
Lr LINE
Ls LINE
t0 TIME POINT
Ta DETERMINATION TIME
Tb STATIONARY TIME
Tc SPECIFIED TIME
Td TIMEOUT PERIOD
te COUNTER
Vr1 FIRST TARGET SPEED
Vr2 SECOND TARGET SPEED
Vs1 OPERATION SPEED
θ0 REFERENCE ANGLE
θp1 STOP ANGLE
θp2 STOP ANGLE
θr1 FIRST TARGET ANGLE
θr2 SECOND TARGET ANGLE
θs1 STEERING ANGLE
θs2 STEERING ANGLE.

The invention claimed is:

1. A control system for a work vehicle comprising:
a processor, the processor being configured to:

output a first operation command to operate a steering device of the work vehicle in a first steering direction, in a stopped state of the work vehicle;

monitor a state of the steering device;

determine whether to restrict operation of the steering device in the first steering direction, based on the state during output of the first operation command; and restrict the operation of the steering device in the first steering direction, based on the determination by the processor, wherein the state includes an operation speed of the steering device;

wherein the processor determines to restrict the operation of the steering device in the first steering direction, when a state in which the operation speed during the output of the first operation command is equal to or lower than a determination threshold continues for a determination time.

2. The control system for a work vehicle according to claim 1, wherein the processor outputs the first operation command such that the steering device operates in a target state, and the processor determines whether to restrict the operation of the steering device in the first steering direction, based on a difference between the target state and the state.

3. The control system for a work vehicle according to claim 1, wherein the processor determines whether to restrict the operation of the steering device in the first steering direction after a specified time has elapsed from the output of the first operation command.

4. The control system for a work vehicle according to claim 1, wherein the processor outputs the first operation command such that the steering device operates in the first steering direction to a first target angle, and the processor changes the first target angle to restrict the operation of the steering device in the first steering direction.

5. The control system for a work vehicle according to claim 4, wherein the processor monitors a stop angle indicating a steering angle of the steering device when the steering device operated in the first steering direction based on the first operation command substantially stops, and the processor changes the first target angle to the stop angle.

6. The control system for a work vehicle according to claim 1, wherein the processor stops output of the first operation command to restrict operation of the steering device in the first steering direction.

7. The control system for a work vehicle according to claim 1, wherein the steering device includes a link mechanism that is connected to a wheel of the work vehicle, and a hydraulic cylinder that drives the link mechanism based on hydraulic oil, and wherein the processor is configured to:

monitor a temperature of the hydraulic oil;

determine whether to perform a warm-up process for the steering device based on the temperature of the hydraulic oil; and output the first operation command, based on the determination by the processor.

8. The control system for a work vehicle according to claim 1, wherein the processor is configured to:

output a second operation command to operate the steering device in a second steering direction opposite to the first steering direction, in a stopped state of the work vehicle after operation of the steering device in the first steering direction is restricted.

9. A control method for a work vehicle comprising:

outputting a first operation command to operate a steering device of the work vehicle in a first steering direction, in a stopped state of the work vehicle;

monitoring a state of the steering device;

determining whether to restrict operation of the steering device in the first steering direction, based on the state during output of the first operation command; and restricting the operation of the steering device in the first steering direction, based on the determination about whether to restrict the operation of the steering device, wherein the state includes an operation speed of the steering device;

the control method further comprising determining to restrict the operation of the steering device in the first steering direction, when a state in which the operation speed during the output of the first operation command is equal to or lower than a determination threshold continues for a determination time.

10. The control method for a work vehicle according to claim 9, further comprising:

outputting the first operation command such that the steering device operates in a target state; and determining whether to restrict the operation of the steering device in the first steering direction, based on a difference between the state and the target state.

11. The control method for a work vehicle according to claim 9, further comprising determining whether to restrict the operation of the steering device in the first steering direction after a specified time has elapsed from the output of the first operation command.

12. The control method for a work vehicle according to claim 9, further comprising:

outputting the first operation command such that the steering device operates in the first steering direction to a first target angle; and changing the first target angle to restrict the operation of the steering device in the first steering direction.

13. The control method for a work vehicle according to claim 12, further comprising:

monitoring a stop angle indicating a steering angle of the steering device when the steering device operated in the first steering direction based on the first operation command substantially stops; and changing the first target angle to the stop angle.

14. The control method for a work vehicle according to claim 9, further comprising stopping output of the first operation command to restrict operation of the steering device in the first steering direction.

15. The control method for a work vehicle according to claim 9, wherein the steering device includes a link mechanism that is connected to a wheel of the work vehicle, and a hydraulic cylinder that drives the link mechanism based on hydraulic oil, and the control method further comprising:

monitoring a temperature of the hydraulic oil;

determining whether to warm up the steering device based on the temperature of the hydraulic oil; and outputting the first operation command based on the determination about whether to warm up the steering device.

16. The control method for a work vehicle according to claim 9, further comprising:

outputting a second operation command to operate the steering device in a second steering direction opposite to the first steering direction, in a stopped state of the work vehicle after operation of the steering device in the first steering direction is restricted.

* * * * *